US012726391B2

(12) United States Patent
Cheng et al.

(10) Patent No.: US 12,726,391 B2
(45) Date of Patent: Sep. 1, 2026

(54) SEARCH SPACE CONFIGURATION FOR WIDEBAND COMMUNICATIONS

(71) Applicant: Telefonaktiebolaget LM Ericsson (publ), Stockholm (SE)

(72) Inventors: Jung-Fu Cheng, Fremont, CA (US); Stephen Grant, Pleasanton, CA (US); Yuhang Liu, Lund (SE); Peter Alriksson, Hörby (SE); Emma Wittenmark, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 419 days.

(21) Appl. No.: 18/261,421

(22) PCT Filed: Jan. 13, 2022

(86) PCT No.: PCT/SE2022/050032

§ 371 (c)(1),
(2) Date: Jul. 13, 2023

(87) PCT Pub. No.: WO2022/154732

PCT Pub. Date: Jul. 21, 2022

(65) Prior Publication Data

US 2024/0396773 A1 Nov. 28, 2024

Related U.S. Application Data

(60) Provisional application No. 63/138,238, filed on Jan. 15, 2021.

(51) Int. Cl.
*H04L 27/26* (2006.01)
*H04L 5/00* (2006.01)

(52) U.S. Cl.
CPC ...... *H04L 27/26025* (2021.01); *H04L 5/0053* (2013.01); *H04L 5/0092* (2013.01)

(58) Field of Classification Search
CPC ............ H04L 27/26025; H04L 5/0053; H04L 5/0092; H04W 72/23; H04W 72/0446; H04W 72/232
See application file for complete search history.

(56) References Cited

U.S. PATENT DOCUMENTS

2018/0124744 A1* 5/2018 Xue ...................... H04L 5/0094
2019/0306737 A1 10/2019 Kwak et al.
(Continued)

FOREIGN PATENT DOCUMENTS

CN 109 588 057 A 4/2019
WO 2020206086 A1 10/2020
WO 2020227142 A1 11/2020

OTHER PUBLICATIONS

Extended European Search Report dated May 27, 2025 issued in corresponding European Patent Application No. 25174423.1, consisting of 12 pages.
International Search Report and Written Opinion dated Apr. 19, 2022 for International Application No. PCT/SE2022/050032 filed Jan. 13, 2022, consisting of 11-pages.
(Continued)

*Primary Examiner* — Shukri Taha
(74) *Attorney, Agent, or Firm* — Weisberg I.P. Law, P.A.

(57) ABSTRACT

A method, network node and wireless device (WD) for search space configurations for wideband communications are disclosed. According to one aspect, a method in a network node includes determining a WD processing capability $$N_{BD,\mu}^{B\text{-}slot} \text{ and } N_{CCE,\mu}^{B\text{-}slot}$$

for processing a physical downlink control channel, PDCCH, according to: an operating numerology, μ; and a number B of slots. The method also includes configuring the WD to monitor for PDCCH based at least in part on the
(Continued)

determined processing capability; and transmitting PDCCH to the WD in at least one of two slots $n_0$ and $n_0+x$ in which the WD monitors for PDCCH, where x is greater than zero.

12 Claims, 17 Drawing Sheets

(56) References Cited

U.S. PATENT DOCUMENTS

| | | | | |
|---|---|---|---|---|
| 2020/0022139 | A1 | 1/2020 | Zhou et al. | |
| 2020/0084754 | A1* | 3/2020 | Tsai | H04L 5/0053 |
| 2020/0137737 | A1* | 4/2020 | Jo | H04L 5/1469 |
| 2020/0169991 | A1* | 5/2020 | Lin | H04W 72/56 |
| 2020/0205138 | A1* | 6/2020 | Nam | H04W 24/10 |
| 2023/0292331 | A1 | 9/2023 | Tsai et al. | |

OTHER PUBLICATIONS

ETSI TS 38.101-1 V15.11.0; Technical Specification 5G; NR; User Equipment (UE) radio transmission and reception; Part 1: Range 1 Standalone (3GPP TS 38.101-1 version 15.11.0 Release 15); Nov. 2020, consisting of 250-pages.

3GPP TS 38.211 V15.4.0; 3rd Generation Partnership Project; Technical Specification Group Radio Access Network; NR; Physical channels and modulation (Release 15); Dec. 2018, consisting of 96-pages.

3GPP TS 38.213 V15.7.0; 3rd Generation Partnership Project; Technical Specification Group Radio Access Network; NR; Physical layer procedures for control (Release 15); Sep. 2019, consisting of 108-pages.

3GPP TS 38.101-2 V15.12.0; 3rd Generation Partnership Project; Technical Specification Group Radio Access Network; NR; User Equipment (UE) radio transmission and reception; Part 2: Range 2 Standalone (Release 15); Dec. 2020, consisting of 151-pages.

* cited by examiner

SEARCH SPACE CONFIGURATION FOR WIDEBAND COMMUNICATIONS

CROSS-REFERENCE TO RELATED APPLICATIONS

This application is a Submission Under 35 U.S.C. § 371 for U.S. National Stage Patent Application of International Application No.: PCT/SE2022/050032, filed Jan. 13, 2022, entitled "SEARCH SPACE CONFIGURATION FOR WIDEBAND COMMUNICATIONS," which claims priority to U.S. Provisional Application No. 63/138,238, filed Jan. 15, 2021, entitled "SEARCH SPACE CONFIGURATION FOR WIDEBAND COMMUNICATIONS," the entireties of both of which are incorporated herein by reference.

FIELD

The present disclosure relates to wireless communications, and in particular, to search space configurations for wideband communications.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Mobile broadband will continue to drive the demands for big overall traffic capacity and huge achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments, i.e., with an infrastructure density considerably higher than the densest networks of today.

In 3GPP Technical Release 15 (3GPP Rel-15), a 5G system was specified. The NR standard in 3GPP is designed to provide services for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Besides traditional licensed exclusive bands, NR systems are currently being extended to operate on unlicensed bands. The NR system specifications currently address two frequency ranges (FR1 and FR2), which are summarized in Table 1. To support ever growing mobile traffic, further extension of the NR system to support a spectrum higher than 5.26 GHz is expected in the near future.

TABLE 1

| Frequency range designation | Corresponding frequency range |
|---|---|
| FR1 | 410 MHz-7125 MHz |
| FR2 | 24250 MHz-52600 MHz |

Overview of a Typical Rel-15 NR System

Numerology and Bandwidth Consideration for NR

The downlink transmission waveform in NR is conventional orthogonal frequency division multiplex (OFDM) using a cyclic prefix. The uplink transmission waveform is conventional OFDM using a cyclic prefix with a transform precoding function performing discrete Fourier transform (DFT) spreading that can be disabled or enabled. An example of the basic transmitter block diagram for NR is illustrated in FIG. 1.

Multiple numerologies are supported in NR. A numerology is defined by sub-carrier spacing and cyclic prefix (CP) overhead. Multiple subcarrier spacings (SCS) can be derived by scaling a basic subcarrier spacing by an integer $2^{\mu}$. The numerology used can be selected independently of the frequency band although it is assumed not to use a very small subcarrier spacing at very high carrier frequencies. Flexible network and WD channel bandwidths are supported. The supported transmission numerologies in NR are summarized in Table 2.

TABLE 2

| $\mu$ | $\Delta f = 2^{\mu} \cdot 15$ [kHz] | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

From the RAN1 specification perspective, maximum channel bandwidth per NR carrier is 400 MHz in 3GPP Rel-15. At least for single numerology case, candidates of the maximum number of subcarriers per NR carrier is 3300 in 3GPP Rel-15 from the RAN1 specification perspective.

Downlink and uplink transmissions are organized into frames with 10 ms duration, consisting of ten 1 ms subframes. Each frame is divided into two equally-sized half-frames of five subframes each. The slot duration is 14 symbols with Normal CP and 12 symbols with Extended CP, and scales in time as a function of the used sub-carrier spacing so that there is always an integer number of slots in a subframe. More specifically, the number of slots per subframe is 2.

The basic NR downlink physical resource within a slot can thus be seen as a time-frequency grid as illustrated in FIG. 2 for 15 kHz sub-carrier spacing numerology, where each resource element corresponds to one OFDM subcarrier during one OFDM symbol interval. A resource block is defined as 12 consecutive subcarriers in the frequency domain. The uplink subframe has the same subcarrier spacing as the downlink and the same number of single carrier (SC)-frequency division multiple access (FDMA) symbols in the time domain as OFDM symbols in the downlink.

PDCCH Monitoring in NR

In the 3GPP NR standard, downlink control information (DCI) is received over the physical downlink control channel (PDCCH). The PDCCH may carry DCI in messages with different formats. DCI format 0_0 and 0_1 are DCI messages used to convey uplink grants to the WD for transmission of the physical layer data channel in the uplink (PUSCH) and DCI format 1_0 and 1_1 are used to convey downlink grants for transmission of the physical downlink shared channel (PDSCH). Other DCI formats (2_0, 2_1, 2_2 and 2_3) are used for other purposes such as transmission of slot format information, reserved resources, transmit power control information etc.

A PDCCH candidate is searched within a common search space or a WD-specific search space which is mapped to a set of time and frequency resources referred to as a control resource set (CORESET) instance. The search spaces within which PDCCH candidates must be monitored are configured to the WD via radio resource control (RRC) signaling. A monitoring periodicity is also configured for different search space sets. A CORESET is defined by the frequency domain location and size as well as the time domain size. A CORESET in NR can be 1, 2 or 3 OFDM symbols in duration. The smallest unit used for defining CORESETs is a Resource Element Group (REG) which is defined as spanning 12 subcarriers×1 OFDM symbol in frequency and time. Resource-element groups within a control-resource set are numbered in increasing order in a time-first manner, starting with 0 for the first OFDM symbol and the lowest-numbered resource block in the control resource set. As a result, though different PDCCHs can occupy different amounts of frequency domain resources, all PDCCHs in a CORESET have the same duration as the duration of the CORESET.

Each resource element group (REG) contains demodulation reference signals (DM-RS) to aid in the estimation of the radio channel over which that REG was transmitted. When transmitting the PDCCH, a precoder could be used to apply weights at the transmit antennas based on some knowledge of the radio channel prior to transmission. It is possible to improve channel estimation performance at the WD by estimating the channel over multiple REGs that are proximate in time and frequency if the precoder used at the transmitter for the REGs is not different. To assist the WD with channel estimation, the multiple REGs can be grouped together to form a REG bundle and the REG bundle size for a CORESET is indicated to the WD. The WD may assume that any precoder used for the transmission of the PDCCH is the same for all the REGs in the REG bundle. A REG bundle may consist of 2, 3 or 6 REGs.

A control channel element (CCE) consists of 6 REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used.

PDCCHs targeting different coverage ranges are designed based on assigning different amount of frequency domain resources to the PDCCHs. A PDCCH candidate may span 1, 2, 4, 8 or 16 CCEs and the number of aggregated CCEs used is referred to as the aggregation level for the PDCCH candidate. A hashing function is used to determine the CCEs corresponding to PDCCH candidates that a WD must monitor within a search space set. An example set of PDCCH candidates in a CORESET with 32 available CCEs is illustrated in FIG. 3. The hashing is done differently for different WDs and in different slots so that the CCEs used by the WDs are randomized and the probability of collisions between multiple WDs for which PDCCH messages are included in a CORESET is reduced.

Blind decoding of potential PDCCH transmissions is attempted by the WD in each of the configured PDCCH candidates within a slot. In any particular slot, the WD may be configured to monitor multiple PDCCH candidates in multiple search spaces which may be mapped to one or more CORESETs. PDCCH candidates may need to be monitored multiple times in a slot, once every slot or once in multiple of slots. The maximum number of PDCCH candidates that can be monitored by a WD for a carrier within a slot are summarized in Table 3. The complexity incurred at the WD to do this depends on the number of CCEs which need to be processed to test all the candidates in the CORESET. Channel estimation is a contributor to the complexity incurred by the WD. The maximum number of CCEs of channel estimation supported by the WD for a carrier within a slot are also summarized in Table 3.

TABLE 3

| SCS | 15 kHz | 30 kHz | 60 kHz | 120 kHz |
|---|---|---|---|---|
| Max # of candidates | 44 | 36 | 22 | 20 |
| Max # of CCE estimation | 56 | 56 | 48 | 32 |

Consideration for Extended NR to Higher Frequency Range Numerologies and Frame Structures It may be desirable to support features for FR1 and FR2 as defined in NR with minimal change (if possible) and support a common design structure that could support various use cases. To that extent, using an integer ratio between clock rates of NR below and NR above 52.6 GHz should be investigated. One possibility to achieve this would be to maintain the NR numerology scaling principle but extend to higher numerologies, i.e., $\Delta f=2\mu\times15$ kHz with an appropriate range of possible integer values for $\mu$.

For any of the waveform candidates under consideration for the higher frequency bands (including the discrete Fourier transform spread (DFTS)-OFDM and single carrier (SC) waveforms discussed in the above), such a structure is illustrated in FIG. 4. In the illustration of FIG. 4, samples of the modulation symbols are organized in block symbols. For the OFDM and the DFTS-OFDM waveforms, such a block symbol is referred to as an OFDM symbol.

Limited Signal Powers

The frequency bands above 52.6 GHz may consist of various combinations of:

Primary access by a mobile system;

Secondary access by a mobile system; and/or

License-exempt access by a mobile system.

Regulatory regimes in different parts of the world may impose different use restriction and requirements to protect other adjacent non-mobile systems. Total output power and/or output power spectral density (PSD) may be limited by applicable regulations in different regulatory regions. For instance, the current European regulation for 57-66 GHz is that the maximum mean equivalent isotropic radiated power (EIRP) is 13 dBm per MHz and the max mean EIRP is 40 dBm. As another example, the U.S. regulation for 57-71 GHz is the maximum mean EIRP is 40 dBm, which can be used with a bandwidth of at least 100 MHz The U.S. regulation for 71-76 and 81-86 GHz is the maximum EIRP is 55 dBm and the maximum power spectral density is 21.76 dBm per 100 MHz.

Furthermore, radio signals at higher frequency bands suffer more attenuation in propagation. The path loss is proportional to the second order of the carrier frequency. As discussed in previous paragraphs, devices at such high frequency bands cannot generate high output power, either. Based on a survey of various device specifications, it can be observed that the available power decreases roughly proportional to the carrier frequency. Taking the combination of increased propagation loss and limited output power at higher frequencies the received power for high frequency band signals can be expected to scale inversely with the third order of the carrier frequency relative to a lower frequency band signal at the same distance from the transmitters. For instance, one can expect the received power for a 60 GHz band signal to be roughly 30 dB lower than a 6 GHz band signal at the same distance from the transmitter.

It is expected that WDs and many network nodes, e.g., base stations, will use analog/hybrid beamforming with lower beam flexibility, particularly for small cell scenarios. The WD may be equipped with more than one antenna panel. However, it is generally assumed that the WD will select the best panel to form only one beam due to additional component costs and power consumption (e.g., analog to digital circuits).

At the base station (hereafter referred to as a network node), higher transmission powers can be achieved by transmitting from multiple antenna panels to overcome severe propagation losses. The multiple antenna panels may be split to carry multiple beams/signals, each of which will have lower power and beamforming gains. FIG. 5 shows two antenna configurations: one for a single beam, and one for 2 beams. multiple beams and signals can be used either in frequency division multiplexing (FDM) or, if the target directions are well separated, in spatial division multiplexing (SDM).

In general, given the narrow beam patterns and very short slot durations, the likelihood and necessity of the network node transmitting to two or more users simultaneously is low. Thus, FDM and SDM can be supported but not necessarily optimized.

System Information Block Type1 (SIB1)

SIB1 is scheduled on the physical downlink shared channel (PDSCH) by the PDCCH scrambled with SI-radio network temporary identifier (RNTI) in the Type0-PDCCH common search space set. If during cell search, a WD determines from the master information block (MIB) that a CORESET for Type0-PDCCH CSS set is present, as described in Subclause 4.1 of the 3GPP Technical Standard (TS) 38.213, the WD determines a number of consecutive resource blocks and a number of consecutive symbols for the CORESET of the Type0-PDCCH CSS set from controlResourceSetZero (an index to a row in a first table) in pdcch-ConfigSIB1. This is described in Tables 13-1 through 13-10 in 3GPP TS 38.213. These tables provide the duration, bandwidth, and PRB location of CORESET0. The WD determines the configuration of the PDCCH monitoring occasions from searchSpaceZero (an index to a row in a second table) in pdcch-ConfigSIB1, included in MIB, for example as described in Tables 13-11 through 13-15 in 3GPP TS 38.213.

For a synchronization signal (SS)/physical broadcast channel (PBCH) block and CORESET multiplexing pattern 1, the WD monitors two consecutive slots starting from the one indicated by the procedure in 3GPP TS 38.213 § 13.

The WD determines which table (Tables 13-1 through 13-10) to use based on a combination of the sub-carrier spacing for the detected SS/PBCH block (as defined in 3GPP TS 38.101-1 per band), the sub-carrier spacing of PDCCH (as indicated by subCarrierSpacingCommon in MIB), the frequency range FR1/FR2, and the minimum channel bandwidth (for example as defined by 3GPP TS 38.101-1 per band).

There are a number of exceptions where 3GPP TS 38.101-1/2 defines two different sub-carrier spacings for the SS/PBCH block for a band. For those cases the WD needs to try both sub-carrier spacings when detecting the SS/PBCH block.

As discussed above, the WD blind decoding and channel estimation capabilities for processing PDCCH reduce exponentially with the numerology. The 3GPP Rel-15 PDCCH processing capabilities per slot can be fitted to formula to obtain initial benchmarks for further discussion. Using the minimum mean absolute deviation fitting, the fitted formulae are given by:

$$N_{BD,\mu}^{slot} \cong 44 \times 2^{-0.38\mu}$$

$$N_{CCE,\mu}^{slot} \cong 62.6 \times 2^{-0.32\mu}$$

The fitted and extrapolated PDCCH processing capabilities per slot are shown in Table 4, where the values for 240 kHz SCS and above are extrapolated values for sub-carrier spacings larger than 120 kHz. Since $$N_{CCE,\mu}^{slot} \text{ for } \mu = 0 \text{ and } \mu = 1$$

are identical, the fitting takes a nominal μ=0.5 to pair with $$N_{CCE,\mu}^{slot} = 56$$

as input. It can be observed that WD processing capabilities may become extremely limited when using large sub-carrier spacing and very short frame structures for high-frequency bands. There are then doubts about whether the WD operating with ≥1920 kHz SCS can support even one AL-16 PDCCH or the default number of candidates for monitoring the seven PDCCH candidates in Type0A-PDCCH CSS as specified in NR specifications.

TABLE 4

| μ | 0 | 1 | 2 | 3 | 4 | 5 | 6 | 7 | 8 |
|---|---|---|---|---|---|---|---|---|---|
| SCS [KHz] | 15 | 30 | 60 | 120 | 240 | 480 | 960 | 1920 | 3840 |
| $N_{BD,\mu}^{slot}$ | 44 | 36 | 22 | 20 | | | | | |
| Estimate | 44 | 34 | 26 | 20 | 15 | 12 | 9 | 7 | 5 |
| μ | 0 | 1 | 2 | 3 | 4 | 5 | 6 | 7 | 8 |
| SCS [KHz] | $15*2^{0.5}$ | | 60 | 120 | 240 | 480 | 960 | 1920 | 3840 |
| $N_{CCE,\mu}^{slot}$ | 56 | | 48 | 32 | | | | | |
| Estimate | 56 | | 40 | 32 | 26 | 20 | 16 | 13 | 10 |

One possible direction is to reduce the periodicity of PDCCH monitoring at a WD to allow more time for the WD to process the PDCCH candidates. For instance, FIG. 6 illustrates a case where the WD is configured to monitor PDCCH candidates every slot bundle with bundling size B=4 slots.

PDCCH monitoring per multiple slots is in fact supported using RRC configuration in 3GPP Rel-15 specifications. In the configuration of SearchSpace, the monitoring periodicity and the offset within the periodicity can be configured using the following parameter, which allows the periodicity to be configured as 1, 2, 4, 5, 8, 10, . . . slots up to a maximum of 2560 slots.

```
monitoringSlotPeriodicityAndOffset CHOICE {
sl1          NULL,
sl2          INTEGER (0..1),
sl4          INTEGER (0..3),
sl5          INTEGER (0..4),
sl8          INTEGER (0..7),
sl10         INTEGER (0..9),
sl16         INTEGER (0..15),
sl20         INTEGER (0..19),
sl40         INTEGER (0..39),
sl80         INTEGER (0..79),
sl160        INTEGER (0..159),
sl320        INTEGER (0..319),
sl640        INTEGER (0..639),
sl1280       INTEGER (0..1279),
sl2560       INTEGER (0..2559)
}
```

With the definition of slot bundling with bundle size B, the corresponding PDCCH monitoring periodicity should be limited to integer multiples of B. For example, for bundle size B=4, the PDCCH monitoring periodicity can be chosen from 4, 8, 16, 20, etc., slots.

There are several remaining problems to enable the multi-slot PDCCH monitoring in general, for example:

How does WD PDCCH processing capabilities scale with the configured slot bundle size B?

How is the multi-slot PDCCH monitoring parameters (periodicity and offset) configured for WDs in initial access?

SUMMARY

Some embodiments advantageously provide methods, network nodes and wireless devices for configuring and determining search space configurations for wideband communications.

According to one aspect, a network node configured to communicate with a WD, includes processing circuitry configured to: determine a WD processing capability $$N_{BD,\mu}^{B\text{-}slot} \text{ and } N_{CCE,\mu}^{B\text{-}slot},$$

for processing a physical downlink control channel, PDCCH, according to: an operating numerology, μ; and a number B of slots. The processing circuitry is also configured to configure the WD to monitor for PDCCH based at least in part on the determined processing capability; and transmit PDCCH to the WD in at least one of two slots $n_0$ and $n_0+x$ in which the WD monitors for PDCCH, where x is greater than zero.

According to this aspect, in some embodiments, $x=\lceil 2^{\mu-3} \rceil$, where $\lceil\ \rceil$ is a ceiling function giving the smallest integer no smaller than its argument. In some embodiments, the operating numerology is one of μ=5 and μ=6, B is one of B=4 and B=8, and x is one of x=4 and x=8. In some embodiments, x is indicated by a bit that indicates one of two offsets for a subcarrier spacing corresponding to the operating numerology μ. In some embodiments, the network node also include a memory in communication with the processing circuitry and configured to store a value of x for each of a plurality of subcarrier spacings.

According to one aspect, a method in a network node configured to communicate with a WD includes: determining a WD processing capability slots no and $n_0+x$ in which the WD monitors for PDCCH, where x is greater than zero.

According to this aspect, in some embodiments, $x=\lceil 2^{\mu-3} \rceil$, where $\lceil\ \rceil$ is a ceiling function giving the smallest integer no smaller than its argument. In some embodiments, the operating numerology is one of μ=5 and μ=6, B is one of B=4 and B=8, and x is one of x=4 and x=8. In some embodiments, x is indicated by a bit that indicates one of two offsets for a subcarrier spacing corresponding to the operating numerology μ. In some embodiments, the method includes storing a value of x for each of a plurality of subcarrier spacings.

According to another aspect, a network node configured to communicate with a wireless device, WD includes processing circuitry configured to: determine a WD processing capability $$N_{BD,\mu}^{B\text{-}slot} \text{ and } N_{CCE,\mu}^{B\text{-}slot},$$

for processing a physical downlink control channel, PDCCH, according to a non-linear function of: a reference numerology, $\mu_{ref}$; an operating numerology, μ; a number B of slots; and a reference processing capability, $$N_{BD,\mu_{ref}}^{slot} \text{ and } N_{CCE,\mu_{ref}}^{slot}$$

based at least in part on the reference numerology, $\mu_{ref}$; and configure the WD to monitor for PDCCH based at least in part on the determined processing capability.

According to this aspect, in some embodiments, determining the processing capability included determining a logarithm of B. In some embodiments, determining the processing capability includes determining:

$$N_{BD,\mu}^{B-slot} = N_{BD,\mu_{ref}}^{slot},\ N_{CCD,\mu}^{B-slot} = N_{CCE,\mu_{ref}}^{slot}, \text{ where } \mu_{ref} = \mu - \lceil \log_2 B \rceil$$

where $\lceil\ \rceil$ is a ceiling function giving the smallest integer no smaller than its argument. In some embodiments, B is an integer multiple of $2^{\mu-\mu_{ref}}$. In some embodiments, the process also includes configuring the WD to monitor two PDCCH slots selected based at least in part on the operating numerology μ. In some embodiments, the two PDCCH slots are slots n and n+x, n being a slot index and $x=\lceil 2^{\mu-3} \rceil$, where $\lceil\ \rceil$ is a ceiling function giving the smallest integer no smaller than its argument. In some embodiments, the reference numerology is $\mu_{ref}=3$, the operating numerology is one of μ=5 and μ=6, B is one of B=4 and B=8, and two PDCCH slots to be monitored by the WD are slots n and n+x, where x is one of x=4 and x=8. In some embodiments, $$N_{BD,\mu}^{B\text{-}slot} \text{ and } N_{CCE,\mu}^{B-slot}$$

are determined from a lookup table.

According to yet another aspect, a method in a network node configured to communicate with a wireless device, WD, the method comprising: determining a WD processing capability $$N_{BD,\mu}^{B\text{-}slot} \text{ and } N_{CCE,\mu}^{B\text{-}slot}$$

for processing a physical downlink control channel, PDCCH, according to a non-linear function of: a reference numerology, $\mu_{ref}$; an operating numerology, $\mu$; a number B of slots; and a reference processing capability, $$N_{BD,\mu_{ref}}^{slot} \text{ and } N_{CCE,\mu_{ref}}^{slot}$$

based at least in part on the reference numerology, $\mu_{ref}$; and configuring the WD to monitor for PDCCH based at least in part on the determined processing capability.

According to this aspect, in some embodiments, determining the processing capability includes determining a logarithm of B. In some embodiments, determining the processing capability includes determining:

$$N_{BD,\mu}^{B-slot} = N_{BD,\mu_{ref}}^{slot},\ N_{CCD,\mu}^{B-slot} = N_{CCE,\mu_{ref}}^{slot},\ \text{ where } \mu_{ref} = \mu - \lceil \log_2 B \rceil$$

where $\lceil\ \rceil$ is a ceiling function giving the smallest integer no smaller than its argument. In some embodiments, B is an integer multiple of $2^{\mu-\mu_{ref}}$. In some embodiments, $$N_{BD,\mu}^{B\text{-}slot} \text{ and } N_{CCE,\mu}^{B\text{-}slot}$$

are determined from a lookup table.

According to yet another aspect a WD is configured to communicate with a network node. The WD includes processing circuitry configured to: operate according to a processing capability $$N_{BD,\mu}^{B\text{-}slot} \text{ and } N_{CCE,\mu}^{B\text{-}slot},$$

of the WD for processing a physical downlink control channel, PDCCH, according to: an operating numerology, $\mu$; and a number B of slots. The processing circuitry is also configured to monitor for PDCCH in two slots $n_0$ and $n_0+x$, where x is greater than zero According to this aspect, in some embodiments, $x=\lceil 2^{\mu-3} \rceil$, where $\lceil\ \rceil$ is a ceiling function giving the smallest integer no smaller than its argument. In some embodiments, the operating numerology is one of $\mu=5$ and $\mu=6$, B is one of B=4 and B=8, and x is one of x=4 and x=8. In some embodiments, x is indicated by a bit that indicates one of two offsets x for a subcarrier spacing corresponding to the operating numerology $\mu$. In some embodiments, the WD further includes a memory in communication with the processing circuitry and configured to store a value of x for each of a plurality of subcarrier spacings.

According to another aspect, a method in a wireless device, WD, configured to communicate with a network node includes: operating according to a processing capability $$N_{BD,\mu}^{B\text{-}slot} \text{ and } N_{CCE,\mu}^{B\text{-}slot},$$

of the WD for processing a physical downlink control channel, PDCCH, according to: an operating numerology, $\mu$; and a number B of slots; and monitoring for PDCCH in two slots $n_0$ and $n_0+x$, where x is greater than zero.

According to this aspect, in some embodiments, $x=\lceil 2^{\mu-3} \rceil$, where $\lceil\ \rceil$ is a ceiling function giving the smallest integer no smaller than its argument. In some embodiments, the operating numerology is one of $\mu=5$ and $\mu=6$, B is one of B=4 and B=8, and x is one of x=4 and x=8. In some embodiments, x is indicated by a bit that indicates one of two offsets x for a subcarrier spacing corresponding to the operating numerology $\mu$. In some embodiments, the method also includes storing a value of x for each of a plurality of subcarrier spacings.

According to yet another aspect, a wireless device, WD, configured to communicate with a network node includes processing circuitry configured to: operate according to a processing capability $$N_{BD,\mu}^{B\text{-}slot} \text{ and } N_{CCE,\mu}^{B\text{-}slot},$$

of the WD for processing a physical downlink control channel, PDCCH, according to a non-linear function of: a reference numerology, $\mu_{ref}$; an operating numerology, $\mu$; a number B of slots; and a reference processing capability, $$N_{BD,\mu_{ref}}^{slot} \text{ and } N_{CCE,\mu_{ref}}^{slot}$$

based at least in part on the reference numerology, $\mu_{ref}$.

According to this aspect, in some embodiments, the processing capability is determined based at least in part on a logarithm of B. In some embodiments, the processing capability is determined based at least in part on determining:

$$N_{BD,\mu}^{B-slot} = N_{BD,\mu_{ref}}^{slot},\ N_{CCD,\mu}^{B-slot} = N_{CCE,\mu_{ref}}^{slot},\ \text{ where } \mu_{ref} = \mu - \lceil \log_2 B \rceil$$

where $\lceil\ \rceil$ is a ceiling function giving the smallest integer no smaller than its argument. In some embodiments, B is an integer multiple of $2^{\mu-\mu_{ref}}$. In some embodiments, $$N_{BD,\mu}^{B\text{-}slot} \text{ and } N_{CCE,\mu}^{B\text{-}slot}$$

are determined from a lookup table.

According to another aspect, a method in a wireless device includes: operating according to a processing capability $$N_{BD,\mu}^{B\text{-}slot} \text{ and } N_{CCE,\mu}^{B\text{-}slot}$$

of the WD for processing a physical downlink control channel, PDCCH, according to a non-linear function of: a reference numerology, $\mu_{ref}$; an operating numerology, μ; a number B of slots; and a reference processing capability, $$N_{BD,\mu_{ref}}^{slot} \text{ and } N_{CCE,\mu_{ref}}^{slot}$$

based at least in part on the reference numerology, $\mu_{ref}$.

In some embodiments, the processing capability is determined based at least in part on a logarithm of B. In some embodiments, the processing capability is determined based at least in part on determining:

$$N_{BD,\mu}^{B-slot} = N_{BD,\mu_{ref}}^{slot}, N_{CCD,\mu}^{B-slot} = N_{CCE,\mu_{ref}}^{slot}, \text{ where } \mu_{ref} = \mu - \lceil \log_2 B \rceil$$

where ⌈ ⌉ is a ceiling function giving the smallest integer no smaller than its argument. In some embodiments, B is an integer multiple of $2^{\mu-\mu_{ref}}$. In some embodiments, $$N_{BD,\mu}^{B\text{-}slot} \text{ and } N_{CCE,\mu}^{B\text{-}slot}$$

are determined from a lookup table.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
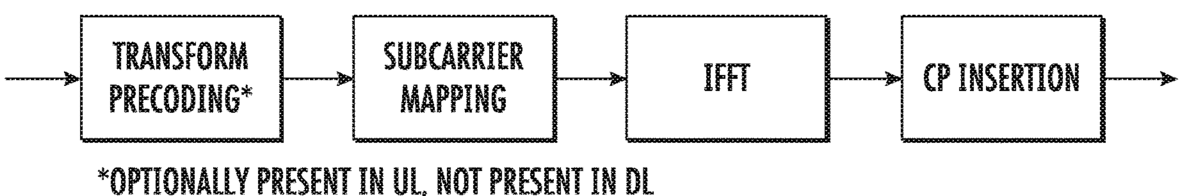
FIG. 1 is a block diagram of an NR transmitter.
Figure 2:
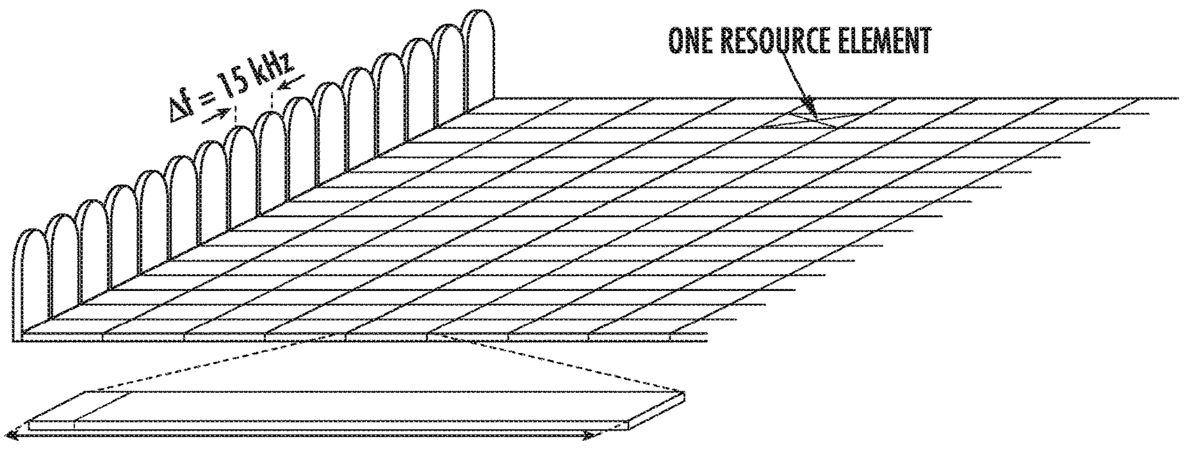
FIG. 2 is an illustration of NR downlink physical resources.
Figure 3:
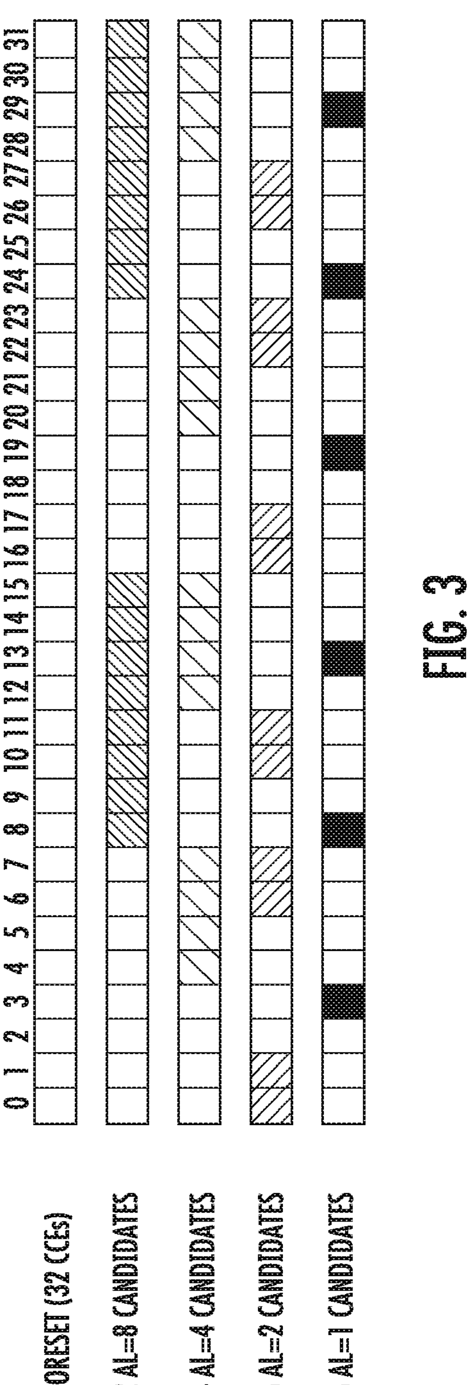
FIG. 3 is an example set of PDCCH candidates.
Figure 4:
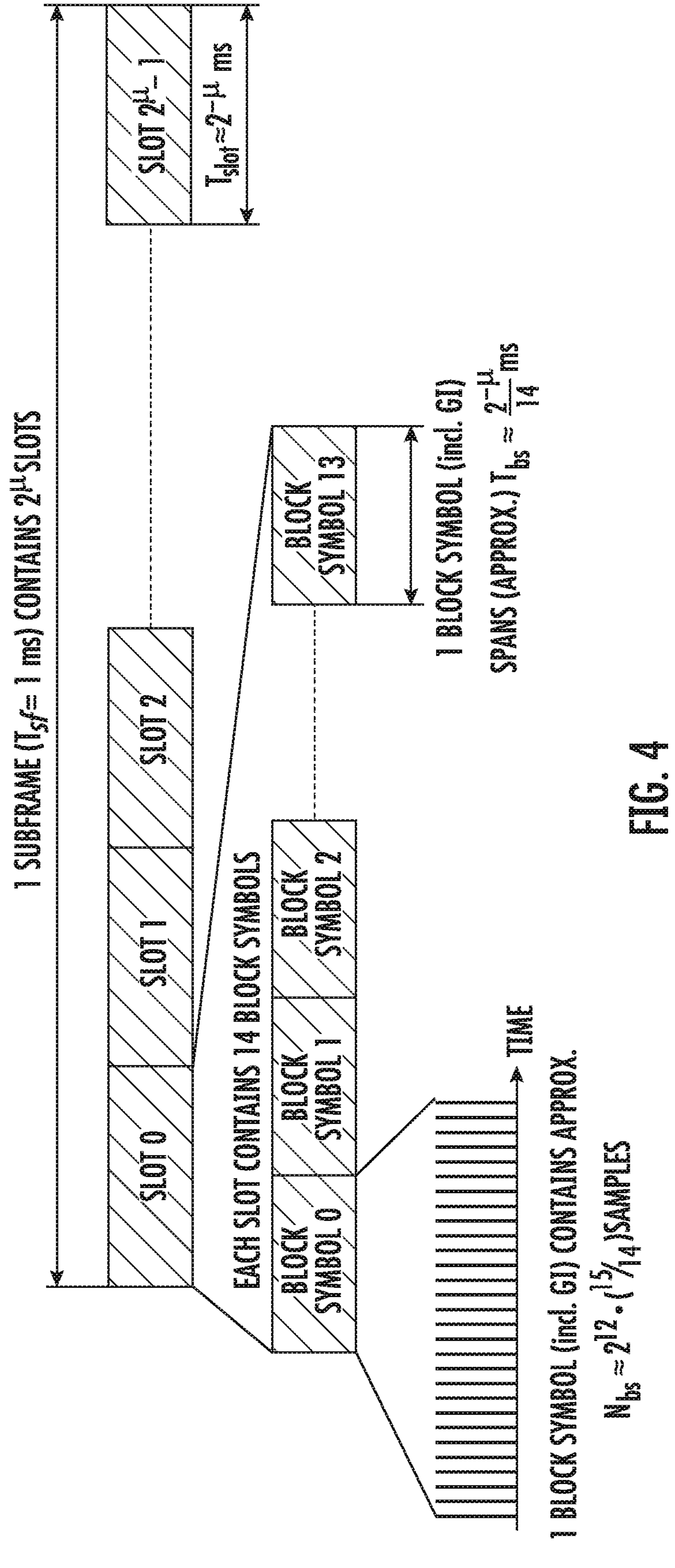
FIG. 4 is an example frame structure.
Figure 5:
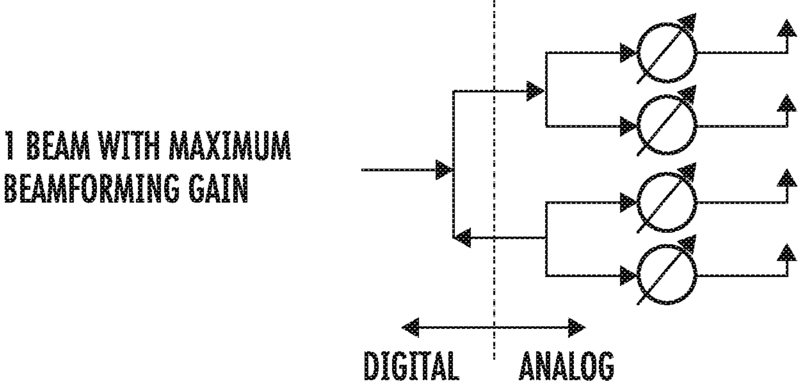
FIG. 5 illustrates hybrid beamforming.
Figure 5:
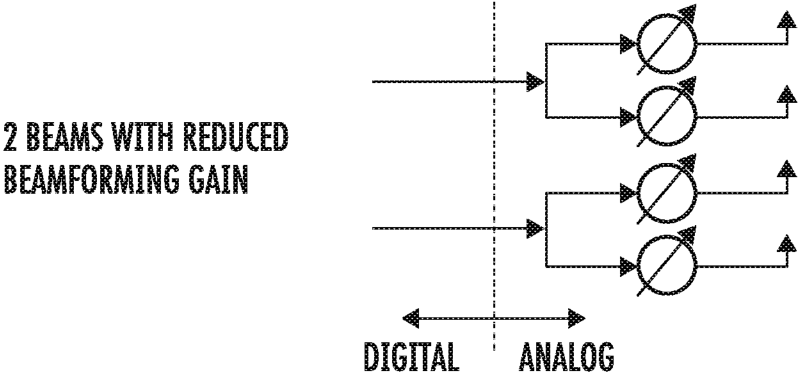
Figure 6:
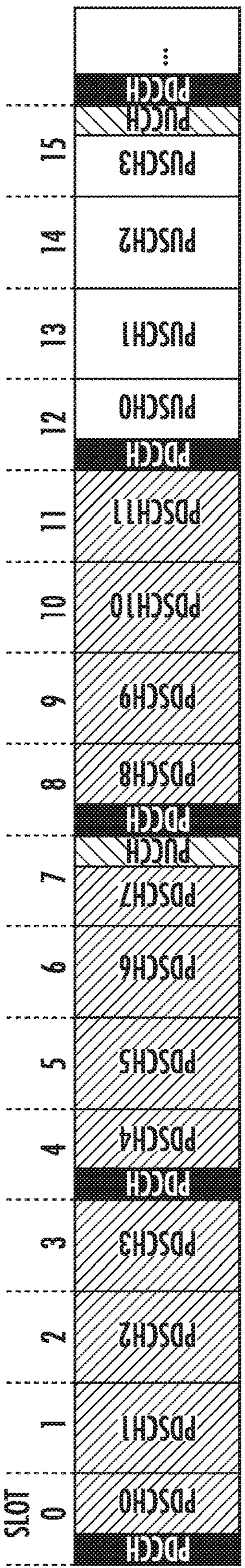
FIG. 6 is an example of multi-slot PDCCH monitoring.

Before describing in detail example embodiments, it is noted that the embodiments reside primarily in combinations of apparatus components and processing steps related to search space configurations for wideband communications. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 7:
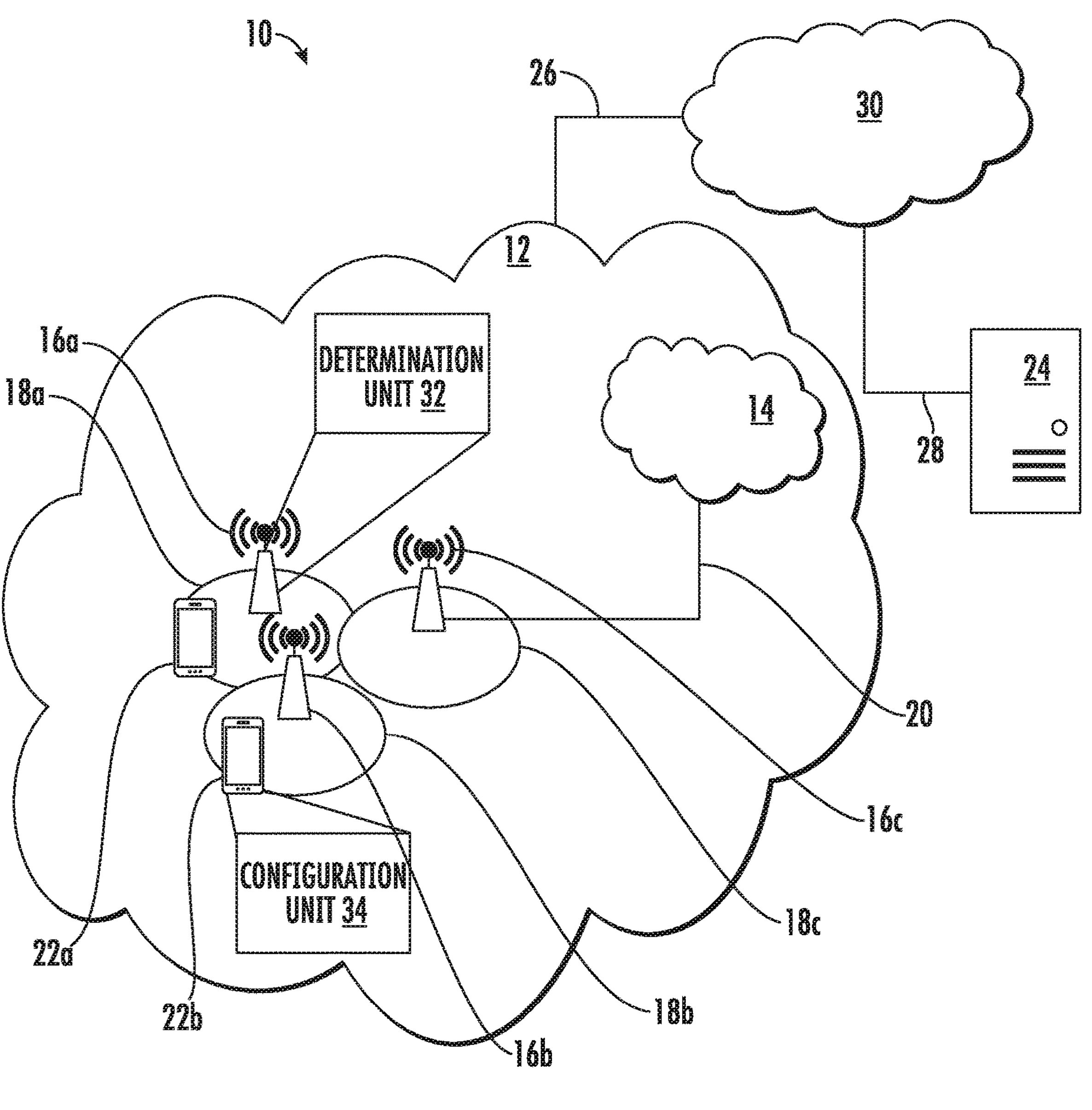
FIG. 7 is a schematic diagram of an example network architecture illustrating a communication system connected via an intermediate network to a host computer according to the principles in the present disclosure.

Some embodiments provide search space configurations for wideband communications. Returning now to the drawing figures, in which like elements are referred to by like reference numerals, there is shown in FIG. 7 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 7 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

In some embodiments, a network node 16 is configured to include a determination unit 32 which is configured to determine a processing capability $$N_{\mu}^{B\text{-}slot},$$

for processing a PDCCH according to a non-linear function of: a reference numerology, $\mu_{ref}=3$; an operating numerology, $\mu$; a number B of PDCCH slots; and a reference processing capability, $$N_{BD,\mu_{ref}}^{slot} \text{ and } n_{CCE,\mu_{ref}}^{slot}$$

based at least in part on the reference numerology, $\mu_{ref}$. In some embodiments, the network node also includes processing circuitry configured to configure the WD to process a physical downlink control channel (PDCCH) according to a numerology and a nonlinear function of the numerology and a slot bundle size.

In some embodiments, a WD 22 is configured to include a configuration unit 34 which is configured to configure a processing capability $$N_{\mu}^{B\text{-}slot},$$

of the WD for processing a physical downlink control channel, PDCCH, according to a non-linear function of: a reference numerology, $\mu_{ref}=3$; an operating numerology, $\mu$; a number B of PDCCH slots; and a reference processing capability, $$N_{BD,\mu_{ref}}^{slot} \text{ and } N_{CCE,\mu_{ref}}^{slot}$$

based at least in part on the reference numerology, $\mu_{ref}$. In some embodiments, the WD includes processing circuitry configured to determine a physical downlink control channel (PDCCH) monitoring occasion based at least in part on a PDCCH monitoring offset, the PDCCH monitoring offset being based at least in part on an ID of the WD.

Example implementations, in accordance with an embodiment, of the WD 22, network node 16 and host computer 24 discussed in the preceding paragraphs will now be described with reference to FIG. 8. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include determination unit 32 which is configured to determine a processing capability $$N_{\mu}^{B\text{-}slot},$$

for processing a PDCCH according to a non-linear function of: a reference numerology, $\mu_{ref}=3$; an operating numerology, $\mu$; a number B of PDCCH slots; and a reference processing capability, $$N_{BD,\mu_{ref}}^{slot} \text{ and } N_{CCE,\mu_{ref}}^{slot}$$

based at least in part on the reference numerology, $\mu_{ref}$.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include configuration unit 34 which is configured to configure a processing capability $$N_{\mu}^{B\text{-}slot},$$

of the WD for processing a physical downlink control channel, PDCCH, according to a non-linear function of: a reference numerology, $\mu_{ref}=3$; an operating numerology, $\mu$; a number B of PDCCH slots; and a reference processing capability, $$N_{BD,\mu_{ref}}^{slot} \text{ and } N_{CCE,\mu_{ref}}^{slot}$$

based at least in part on the reference numerology, $\mu_{ref}$.

Figure 8:
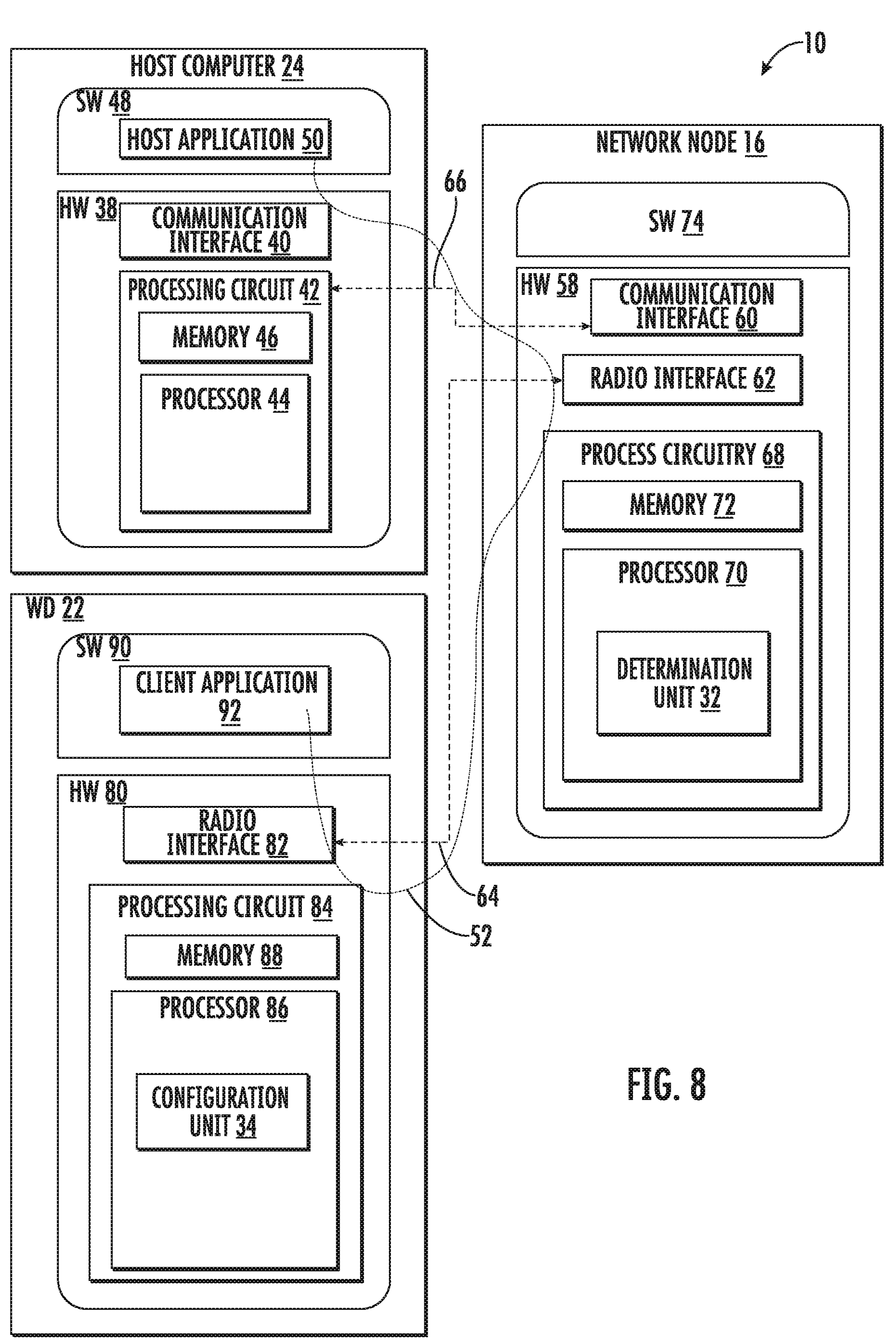
FIG. 8 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 8 and independently, the surrounding network topology may be that of FIG. 7.

In FIG. 8, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 7 and 8 show various "units" such as determination unit 32, and configuration unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Thus, in some embodiments, a network node 16 configured to communicate with a WD 22, includes processing circuitry 84 configured to: determine a processing capability $$N_{\mu}^{B\text{-}slot},$$

for processing a physical downlink control channel, PDCCH, according to a non-linear function of: a reference numerology, $\mu_{ref}=3$; an operating numerology, $\mu$; a number B of PDCCH slots; and a reference processing capability, $$N_{BD,\mu_{ref}}^{slot} \text{ and } N_{CCE,\mu_{ref}}^{slot}$$

based at least in part on the reference numerology, $\mu_{ref}$; and configure the WD 22 based at least in part on the determined processing capability. The processing circuitry 84 is further configured to configure the WD to monitor two PDCCH slots $n_0$ and $n_0+x$, where x is greater than zero.

In some embodiments, a WD 22 is configured to communicate with a network node. The WD 22 includes processing circuitry configured to: configure a processing capability $$N_{\mu}^{B\text{-}slot},$$

of the WD 22 for processing a physical downlink control channel, PDCCH, according to a non-linear function of: a reference numerology, $\mu_{ref}$; an operating numerology, $\mu$; a number B of PDCCH slots; and a reference processing capability, $$N_{BD,\mu_{ref}}^{slot} \text{ and } N_{CCE,\mu_{ref}}^{slot}$$

based at least in part on the reference numerology, $\mu_{ref}$. The processing circuitry 84 is further configured to operate according to the configured processing capability.

In some embodiments, a network node 16 is configured to communicate with a WD 22. The network node 16 includes processing circuitry 68 configured to: determine a processing capability $$N_{\mu}^{B\text{-}slot},$$

for processing a physical downlink control channel, PDCCH, according to a non-linear function of: a reference numerology, $\mu_{ref}=3$; an operating numerology, μ; a number B of PDCCH slots; and a reference processing capability, $$N_{BD,\mu_{ref}}^{slot} \text{ and } N_{CCE,\mu_{ref}}^{slot}$$

based at least in part on the reference numerology, $\mu_{ref}$; and configure the WD 22 based at least in part on the determined processing capability. The processing circuitry 68 is further configured to configure the WD to monitor two PDCCH slots $n_0$ and $n_0+x$, where x is greater than zero.

In some embodiments, a WD 22 is configured to communicate with a network node 16. The WD 22 includes processing circuitry configured to: configure a processing capability $$N_{\mu}^{B\text{-}slot},$$

of the WD 22 for processing a physical downlink control channel, PDCCH, according to a non-linear function of: a reference numerology, $\mu_{ref}=3$; an operating numerology, μ; a number B of PDCCH slots; and a reference processing capability, $$N_{BD,\mu_{ref}}^{slot} \text{ and } N_{CCE,\mu_{ref}}^{slot}$$

based at least in part on the reference numerology, $\mu_{ref}$. The processing circuitry 84 is further configured operate according to the configured processing capability; and monitor two PDCCH slots $n_0$ and $n_0+x$, where x is greater than zero.

Figures 9, 10:
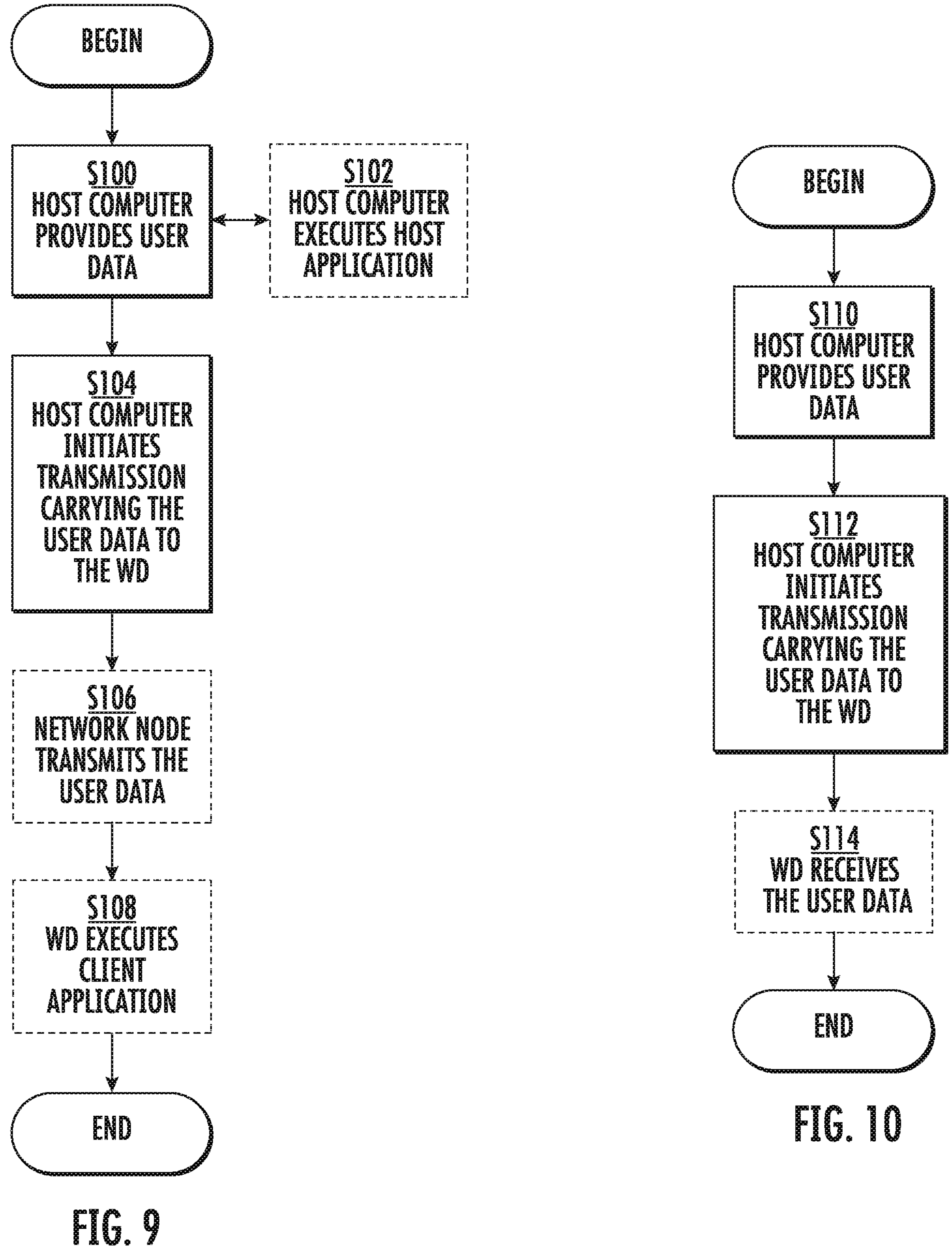
FIG. 9 is a flowchart illustrating example methods implemented in a communication system including a host computer, a network node and a wireless device for executing a client application at a wireless device according to some embodiments of the present disclosure.
FIG. 10 is a flowchart illustrating example methods implemented in a communication system including a host computer, a network node and a wireless device for receiving user data at a wireless device according to some embodiments of the present disclosure.

FIG. 9 is a flowchart illustrating an example method implemented in a communication system, such as, for example, the communication system of FIGS. 7 and 8, in accordance with one embodiment. The communication system may include a host computer 24, a network node 16 and a WD 22, which may be those described with reference to FIG. 8. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 10 is a flowchart illustrating an example method implemented in a communication system, such as, for example, the communication system of FIG. 7, in accordance with one embodiment. The communication system may include a host computer 24, a network node 16 and a WD 22, which may be those described with reference to FIGS. 7 and 8. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 11, 12:
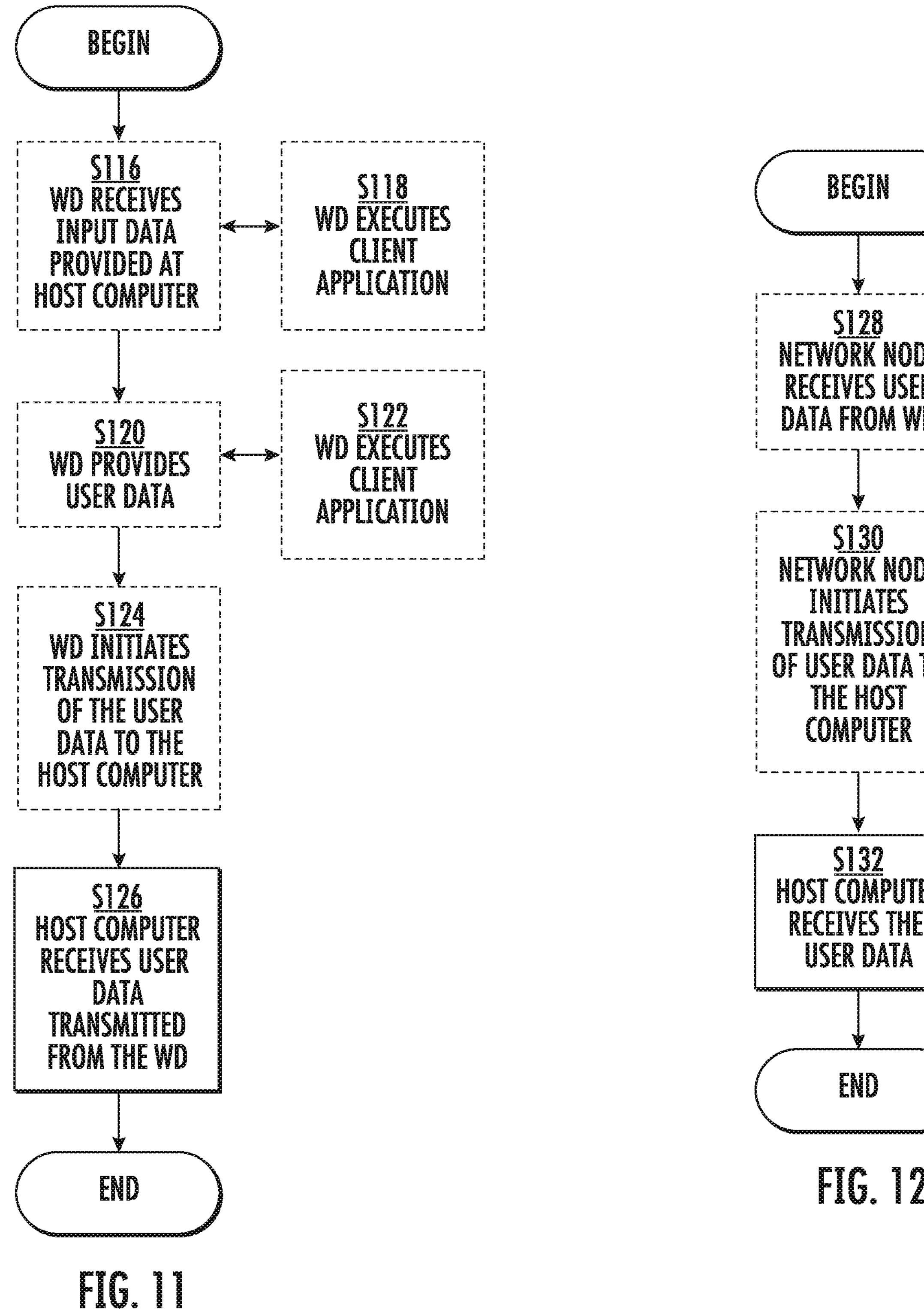
FIG. 11 is a flowchart illustrating example methods implemented in a communication system including a host computer, a network node and a wireless device for receiving user data from the wireless device at a host computer according to some embodiments of the present disclosure.
FIG. 12 is a flowchart illustrating example methods implemented in a communication system including a host computer, a network node and a wireless device for receiving user data at a host computer according to some embodiments of the present disclosure.

FIG. 11 is a flowchart illustrating an example method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 12 is a flowchart illustrating an example method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 13:
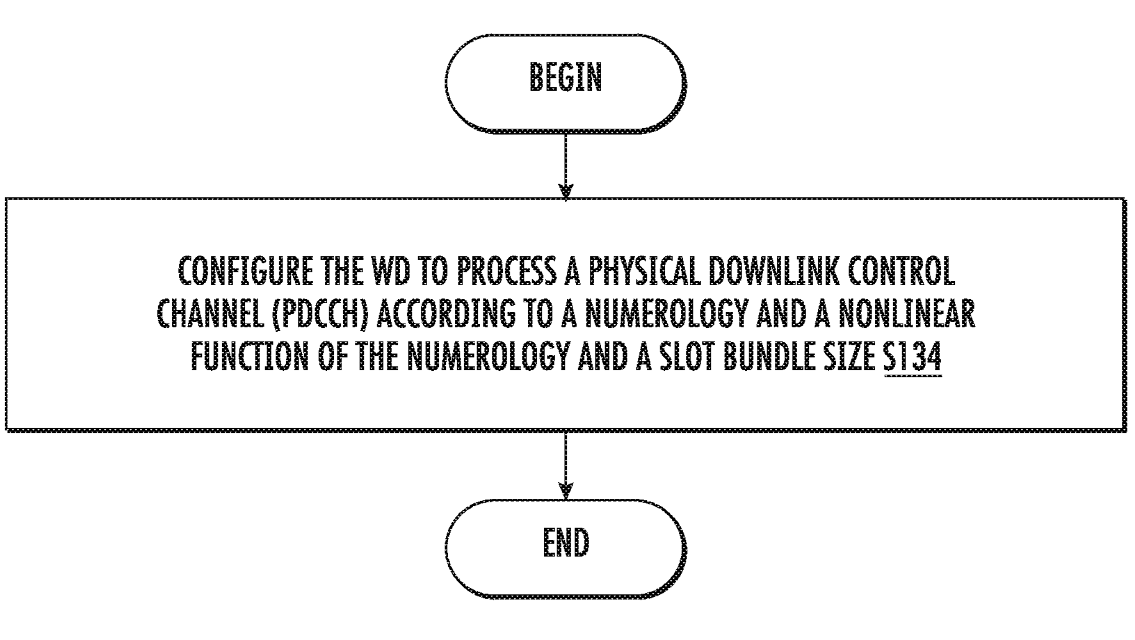
FIG. 13 is a flowchart of an example process in a network node for search space configurations for wideband communications.

FIG. 13 is a flowchart of an example process in a network node 16 for search space configurations for wideband communications. One or more blocks described herein may be performed by one or more elements of network node 16 such as by one or more of processing circuitry 68, processor 70, radio interface 62 and/or communication interface 60. Network node 16 such as via processing circuitry 68 and/or processor 70 and/or radio interface 62 and/or communication interface 60 is configured to configure the WD to process a physical downlink control channel (PDCCH) according to a numerology and a nonlinear function of the numerology and a slot bundle size (Block S134).

Figure 14:
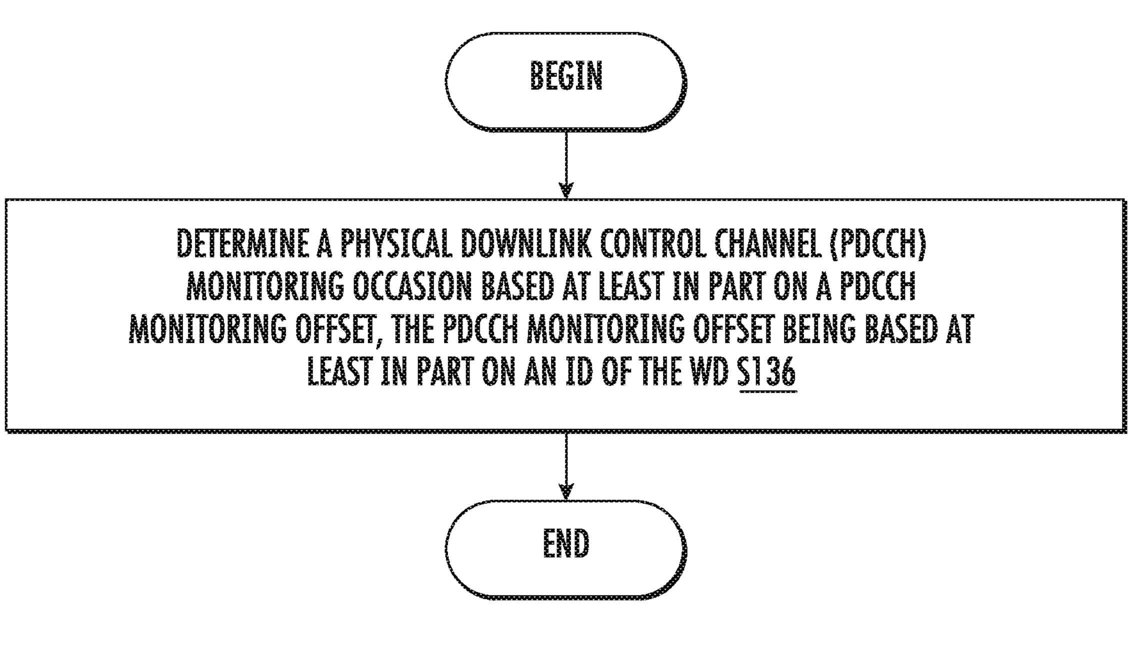
FIG. 14 is a flowchart of an example process in a wireless device for search space configurations for wideband communications.

FIG. 14 is a flowchart of an example process in a wireless device 22 according to some embodiments of the present disclosure. One or more blocks described herein may be performed by one or more elements of wireless device 22 such as by one or more of processing circuitry 84, processor 86, radio interface 82 and/or communication interface 60. Wireless device 22 such as via processing circuitry 84 and/or processor 86 and/or radio interface 82 is configured to determine a physical downlink control channel (PDCCH) monitoring occasion based at least in part on a PDCCH monitoring offset, the PDCCH monitoring offset being based at least in part on an ID of the WD (Block S136).

Figure 15:
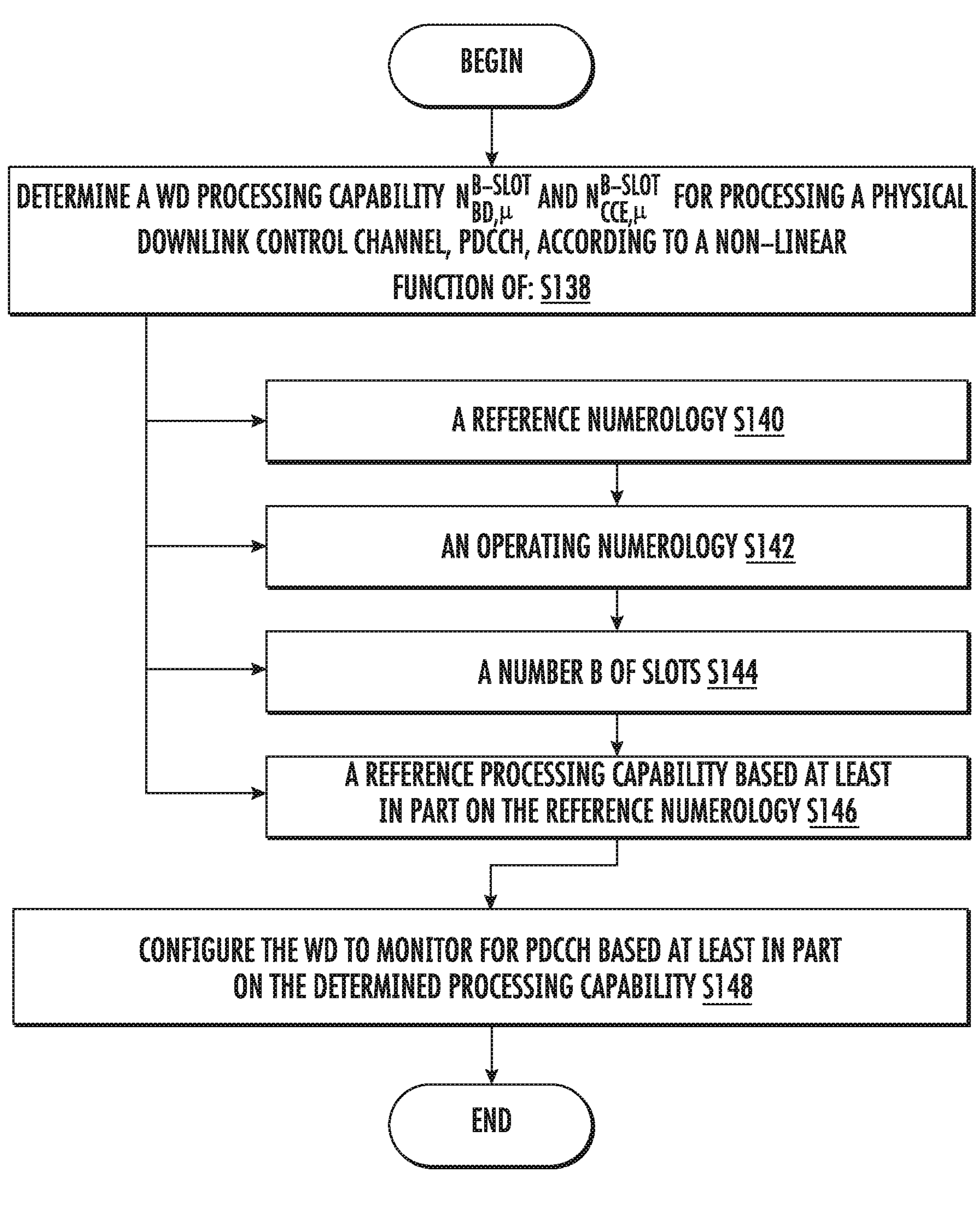
FIG. 15 is a flowchart of another example process in a network node for search space configurations for wideband communications.

FIG. 15 is a flowchart of an example process in a network node 16 for search space configurations for wideband communications. One or more blocks described herein may be performed by one or more elements of network node 16 such as by one or more of processing circuitry 68 (including the determination unit 32), processor 70, radio interface 62 and/or communication interface 60. Network node 16 such as via processing circuitry 68 and/or processor 70 and/or radio interface 62 and/or communication interface 60 is configured to determine WD a processing capability $$N_{BD,\mu}^{B\text{-}slot} \text{ and } N_{CCE,\mu}^{B\text{-}slot}$$

for processing a physical downlink control channel, PDCCH, according to a non-linear function of (Block S138): a reference numerology, $\mu_{ref}$ (Block S140); an operating numerology, μ (Block S142); a number B of slots (Block S144); and a reference processing capability, $$N_{BD,\mu_{ref}}^{B\text{-}slot} \text{ and } N_{CCE,\mu_{ref}}^{B\text{-}slot}$$

based at least in part on the reference numerology, $\mu_{ref}$(Block S146). The process also includes configuring the WD to monitor for PDCCH based at least in part on the determined processing capability (Block S148).

In some embodiments, determining the processing capability included determining a logarithm of B. In some embodiments, determining the processing capability includes determining:

$$N_{BD,\mu}^{B-slot} = N_{BD,\mu_{ref}}^{slot},\ N_{CCD,\mu}^{B-slot} = N_{CCE,\mu_{ref}}^{slot},\ \text{ where } \mu_{ref} = \mu - \lceil \log_2 B \rceil$$

where ⌈ ⌉ is a ceiling function giving the smallest integer no smaller than its argument. In some embodiments, B is an integer multiple of $2^{\mu-\mu_{ref}}$. In some embodiments, the process also includes configuring the WD to monitor two PDCCH slots selected based at least in part on the operating numerology μ. In some embodiments, the two PDCCH slots are slots n and n+x, n being a slot index and $x=\lceil 2^{\mu-3} \rceil$, where ⌈ ⌉ is a ceiling function giving the smallest integer no smaller than its argument. In some embodiments, the reference numerology is $\mu_{ref}=3$, the operating numerology is one of μ=5 and μ=6, B is one of B=4 and B=8, and two PDCCH slots to be monitored by the WD are slots n and n+x, where x is one of x=4 and x=8. In some embodiments, $$N_{BD,\mu}^{B\text{-}slot} \text{ and } N_{CCE,\mu}^{B\text{-}slot}$$

are determined from a lookup table.

Figure 16:
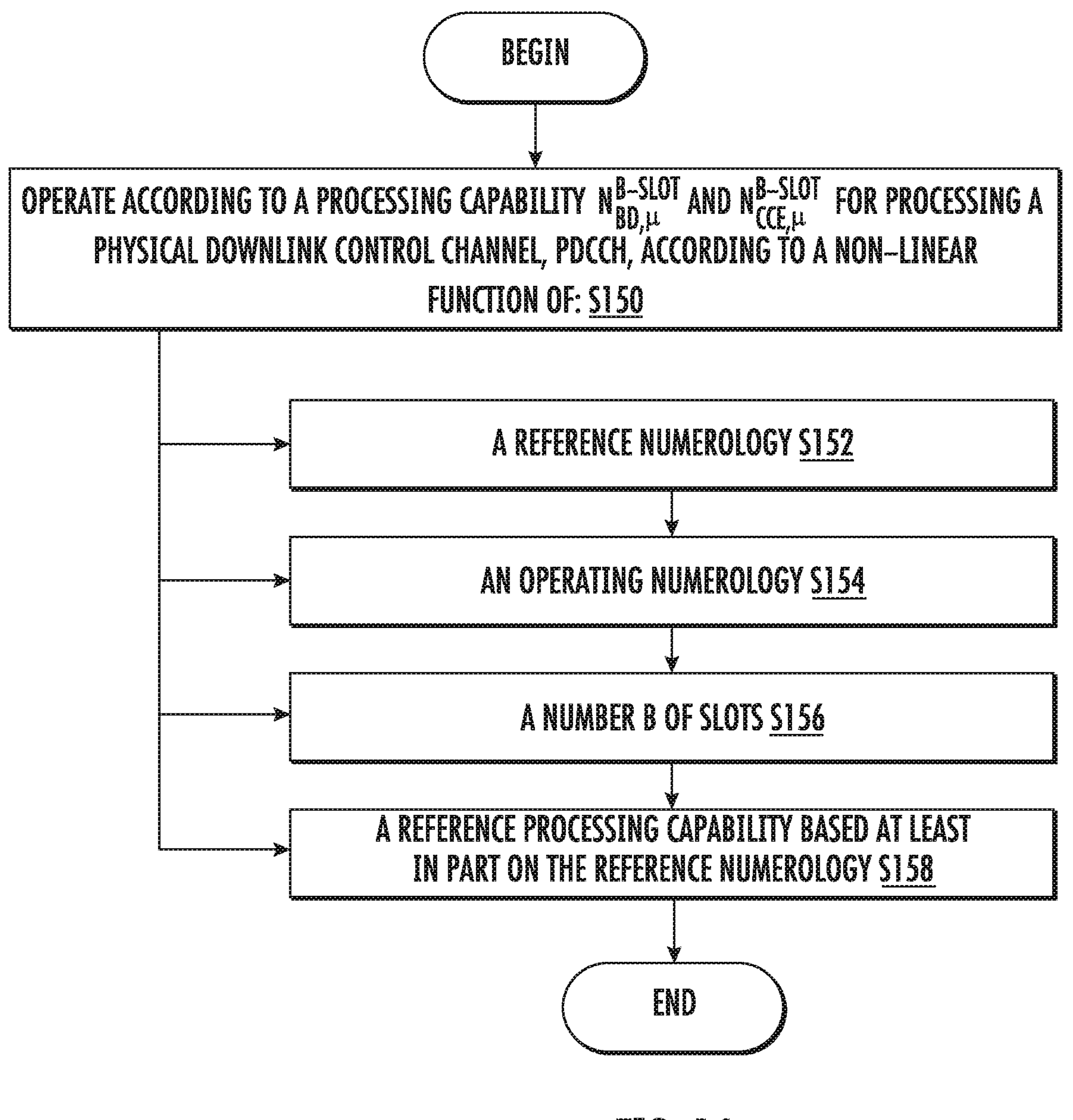
FIG. 16 is a flowchart of another example process in a wireless device for search space configurations for wideband communications.

FIG. 16 is a flowchart of an example process in a wireless device 22 according to some embodiments of the present disclosure. One or more blocks described herein may be performed by one or more elements of wireless device 22 such as by one or more of processing circuitry 84 (including the configuration unit 34), processor 86, radio interface 82 and/or communication interface 60. Wireless device 22 such as via processing circuitry 84 and/or processor 86 and/or radio interface 82 is configured to operate according to a processing capability $$N_{BD,\mu}^{B\text{-}slot} \text{ and } N_{CCE,\mu}^{B\text{-}slot}$$

of the WD 22 for processing a physical downlink control channel, PDCCH, according to a non-linear function of (Block S150): a reference numerology, $\mu_{ref}$ (Block S152); an operating numerology, μ (Block S154); a number B of slots (Block S156); and a reference processing capability, $$N_{BD,\mu_{ref}}^{B\text{-}slot} \text{ and } N_{CCE,\mu_{ref}}^{B\text{-}slot}$$

based at least in part on the reference numerology, $\mu_{ref}$ (Block S158).

In some embodiments, the processing capability is determined based at least in part on a logarithm of B. In some embodiments, the processing capability is determined based at least in part on determining:

$$N_{BD,\mu}^{B-slot} = N_{BD,\mu_{ref}}^{slot},\ N_{CCD,\mu}^{B-slot} = N_{CCE,\mu_{ref}}^{slot},\ \text{ where } \mu_{ref} = \mu - \lceil \log_2 B \rceil$$

where ⌈ ⌉ is a ceiling function giving the smallest integer no smaller than its argument. In some embodiments, B is an integer multiple of $2^{\mu-\mu_{ref}}$. In some embodiments, $$N_{BD,\mu}^{B\text{-}slot} \text{ and } N_{CCE,\mu}^{B\text{-}slot}$$

are determined from a lookup table.

Figure 17:
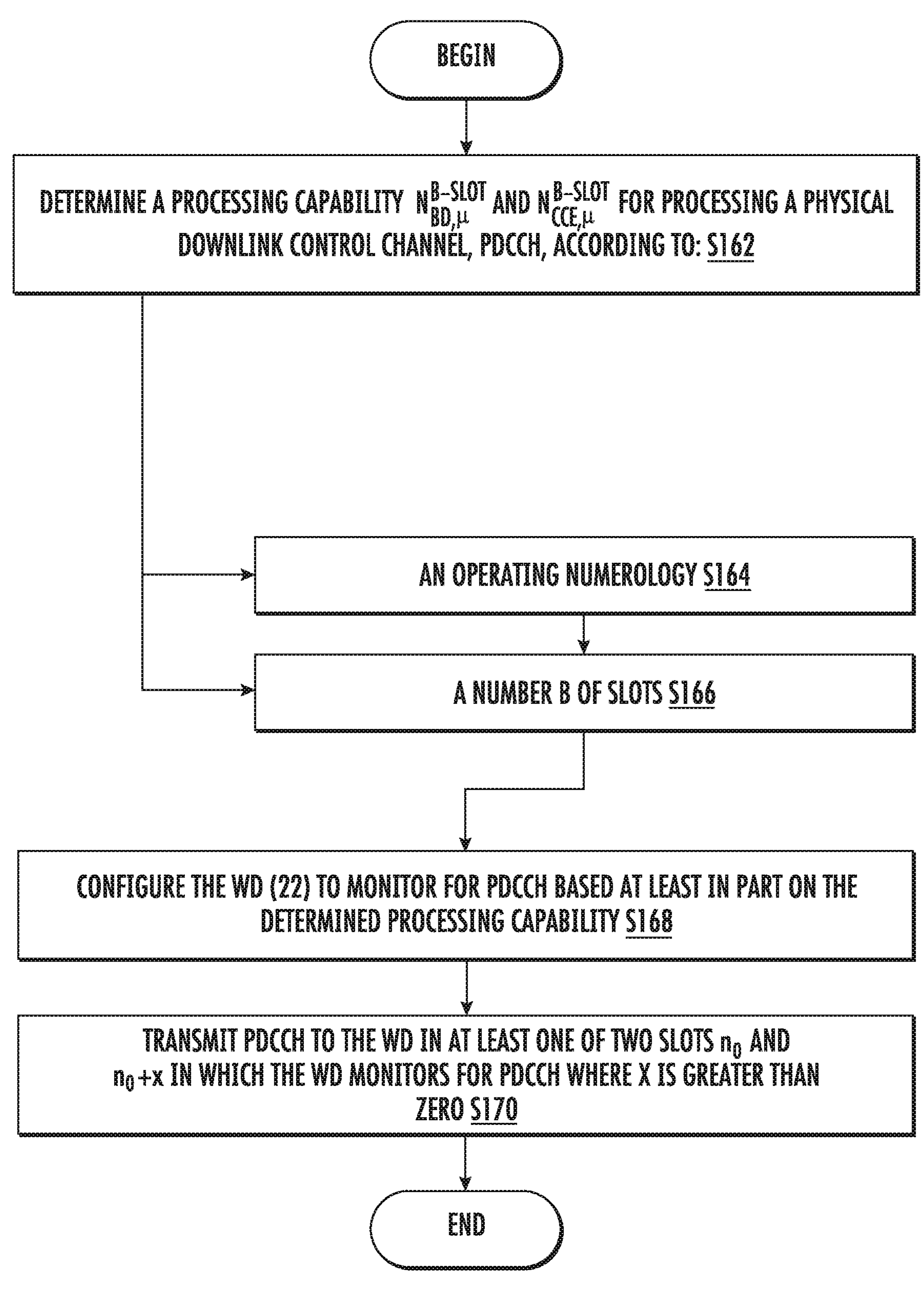
FIG. 17 is a flowchart of yet another example process in a network node for search space configurations for wideband communications.

FIG. 17 is a flowchart of an example process in a network node 16 for search space configurations for wideband communications. One or more blocks described herein may be performed by one or more elements of network node 16 such as by one or more of processing circuitry 68 (including the determination unit 32), processor 70, radio interface 62 and/or communication interface 60. Network node 16 such as via processing circuitry 68 and/or processor 70 and/or radio interface 62 and/or communication interface 60 is configured to determine a WD processing capability $$N_{BD,\mu}^{B\text{-}slot} \text{ and } N_{CCE,\mu}^{B\text{-}slot}$$

for processing a physical downlink control channel, PDCCH, according to (Block S162); and an operating numerology, p (Block S164); a number B of slots (Block S166). The process also includes configuring the WD 22 to monitor for PDCCH based at least in part on the determined processing capability (Block 168). The process also includes transmitting PDCCH to the WD in at least one of two slots $n_0$ and $n_0+x$ in which the WD 22 monitors for PDCCH, where x is greater than zero (Block 170).

In some embodiments, $x=\lceil 2^{\mu-3}\rceil$, where $\lceil\ \rceil$ is a ceiling function giving the smallest integer no smaller than its argument. In some embodiments, the operating numerology is one of μ=5 and μ=6, B is one of B=4 and B=8, and x is one of x=4 and x=8. In some embodiments, x is indicated by a bit that indicates one of two offsets for a subcarrier spacing corresponding to the operating numerology μ. In some embodiments, the method further includes storing a value of x for each of a plurality of subcarrier spacings.

Figure 18:
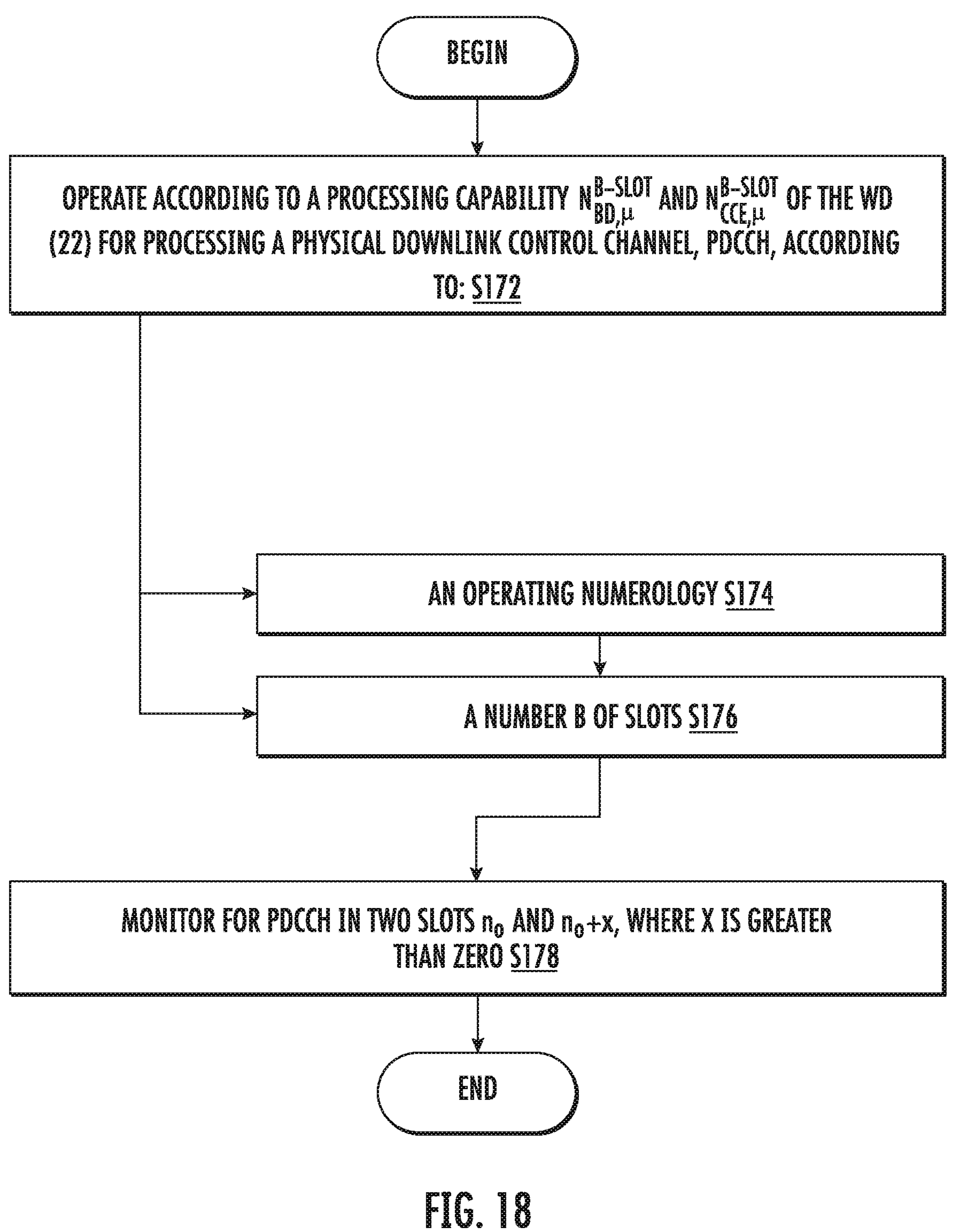
FIG. 18 is a flowchart of yet another example process in a wireless device for search space configurations for wideband communications.

FIG. 18 is a flowchart of an example process in a wireless device 22 according to some embodiments of the present disclosure. One or more blocks described herein may be performed by one or more elements of wireless device 22 such as by one or more of processing circuitry 84 (including the configuration unit 34), processor 86, radio interface 82 and/or communication interface 60. Wireless device 22 such as via processing circuitry 84 and/or processor 86 and/or radio interface 82 is configured to Operate (Block S172) according to a processing capability $$N_{BD,\mu}^{B\text{-}slot} \text{ and } N_{CCE,\mu}^{B\text{-}slot},$$

of the WD 22 for processing a physical downlink control channel, PDCCH, according to: an operating numerology, μ (Block S174); and a number B of slots (Block S176); and monitor for PDCCH in two slots $n_0$ and $n_0+x$, where x is greater than zero (Block S178).

In some embodiments, $x=\lceil 2^{\mu-3}\rceil$, where $\lceil\ \rceil$ is a ceiling function giving the smallest integer no smaller than its argument. In some embodiments, the operating numerology is one of μ=5 and μ=6, B is one of B=4 and B=8, and x is one of x=4 and x=8. In some embodiments, x is indicated by a bit that indicates one of two offsets for a subcarrier spacing corresponding to the operating numerology μ. In some embodiments, the method also includes storing a value of x for each of a plurality of subcarrier spacings.

Having described the general process flow of arrangements of the disclosure and having provided examples of hardware and software arrangements for implementing the processes and functions of the disclosure, the sections below provide details and examples of arrangements for search space configurations for wideband communications.

In the description herein, for any of the waveform candidates under consideration for the higher frequency bands (including the DFTS-OFDM and SC waveforms discussed in the above), a block of samples of the modulation symbols are generally referred to as constituting an OFDM symbol (even when no DFT operation is involved in the transmitter). A resource element group (REG) is defined as 12 subcarriers by 1 OFDM symbol. This may be loosely referred to as a resource block (RB) or physical resource block (PRB) or common resource block (CRB). A REG bundle is defined as either 2, 3, or 6 contiguous (in frequency) REGs. A REG bundle defines the precoder granularity and interleaving granularity for the resources in a CORESET. A CCE is defined as 6 REGs. This may be loosely referred to as 6 RBs/PRBs/CRBs.

Embodiment 1—WD PDCCH Processing Capability Scaling with PDCCH Slot Bundling

In principle, the PDCCH slot bundle size, B, can be flexibly set to any suitable value. However, it may become impractical for WD implementation to optimize the hardware and software timelines to support various required WD processing capabilities associated with arbitrary flexible PDCCH slot bundle sizes. Solutions to simplify the WD PDCCH processing capability requirements are disclosed herein.

According to this embodiment, a reference numerology with $\mu=\mu_{ref}$ and WD PDCCH processing capability requirements per slot given by $$N_{BD,\mu_{ref}}^{slot} = 20 \text{ and } N_{CCE,\mu_{ref}}^{slot} = 32$$

is selected. For a higher numerology $\mu>\mu_{ref}$, the WD PDCCH processing capability requirements per B-slot bundle are given by nonlinear functions depending on B, μ, $\mu_{ref}$ and $$N_{BD,\mu_{ref}}^{slot} \text{ and } N_{CCE,\mu_{ref}}^{slot}:$$

$$N_{BD,\mu}^{B-slot} = f_{BD}\left(B, \mu, \mu_{ref}, N_{BD,\mu_{ref}}^{slot}\right)$$
$$N_{CCE,\mu}^{B-slot} = f_{CCE}\left(B, \mu, \mu_{ref}, N_{CCE,\mu_{ref}}^{slot}\right)$$

In some embodiments, the WD PDCCH processing capability requirements per B slot-bundle for a higher numerology $\mu>\mu_{ref}$, are given by nonlinear functional scaling depending on B, $\mu-\mu_{ref}$ and $$N_{BD,\mu_{ref}}^{slot} \text{ and } N_{CCE,\mu_{ref}}^{slot}:$$

$$N_{BD,\mu}^{B-slot} = f_{BD}\left(B, \mu-\mu_{ref}, N_{BD,\mu_{ref}}^{slot}\right)$$
$$N_{CCE,\mu}^{B-slot} = f_{CCE}\left(B, \mu-\mu_{ref}, N_{CCE,\mu_{ref}}^{slot}\right)$$

Embodiment #1-1

Figure 19:
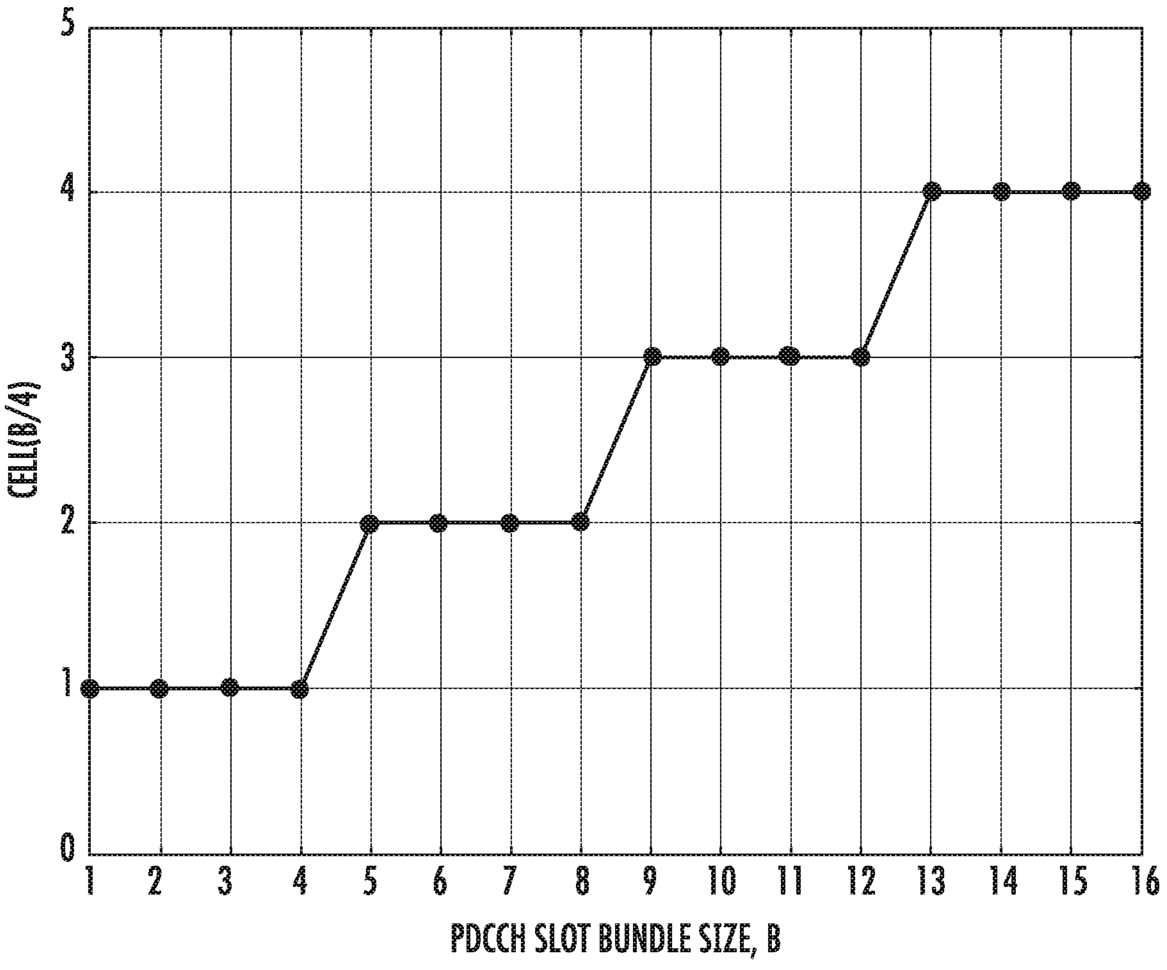
FIG. 19 is a graph of a quantization function.

In some embodiments, the nonlinear function is written in terms of a quantization function $$\left\lceil \frac{B}{2^{\mu-\mu_{ref}}} \right\rceil$$

as follows:

$$N_{BD,\mu}^{B-slot} = \left\lceil \frac{B}{2^{\mu-\mu_{ref}}} \right\rceil \cdot N_{BD,\mu_{ref}}^{slot}$$
$$N_{CCE,\mu}^{B-slot} = \left\lceil \frac{B}{2^{\mu-\mu_{ref}}} \right\rceil \cdot N_{CCE,\mu_{ref}}^{slot}$$

where $\lceil x\rceil$ is the ceiling function giving the smallest integer no smaller than x. An example of a quantization function is illustrated in FIG. 19. For this nonlimiting example embodiment, the preferred PDCCH bundle size settings (B) are integer multiples of $2^{\mu-\mu_{ref}}$. By 'preferred', it is meant that for all values of B that are quantized to the same value, the per-slot monitoring capability of the reference is scaled by the same value as it is for $B=k\cdot 2^{\mu-\mu_{ref}}$ where k is an integer. Using the example in FIG. 19, the preferred values of B are 4, 8, 12, 16. In some embodiments, the WD PDCCH processing capability requirements per slot for $\mu_{ref}=3$ (120 kHz SCS) can be taken as a reference.

According to the WD PDCCH monitoring capability definition in 3GPP Rel-15, the reference blind-decoding and CCE capability per slot are $$N_{BD,\mu_{ref}}^{slot} = 20 \text{ and } N_{CCE,\mu_{ref}}^{slot} = 32$$

respectively for $\mu_{ref}=3$ (120 kHz SCS);

Preferred PDCCH slot bundle size settings for the 480 kHz subcarrier spacing ($\mu=5$) may then be integer multiples of 4. For example, with B=4, the WD PDCCH processing capability requirements per B slot-bundle are then given by $$N_{BD,\mu=5}^{4\text{-}slot} = 20 \text{ and } N_{CCE,\mu=5}^{4\text{-}slot} = 32.$$

Due to the quantization function, the WD PDCCH processing capability requirements for B=2, or 3 are the same as those for B=4. For B=8, 12, 16, . . . the WD PDCCH processing requirements are two, three, four, . . . times larger, respectively; and Preferred PDCCH slot bundle size settings for the 960 kHz subcarrier spacing ($\mu=6$) may then be integer multiples of 8. For example, with B=8, the WD PDCCH processing capability requirements per B slot-bundle are then given by $$N_{BD,\mu=6}^{B\text{-}slot} = 20 \text{ and } N_{CCE,\mu=6}^{8\text{-}slot} = 32.$$

Due to the quantization function, the WD PDCCH processing capability requirements for B=2, 3, . . . , 7 are the same as those for B=8. For B=16, 32 . . . , the WD PDCCH processing requirements are 2, 3, 4, . . . times larger, respectively.

Embodiment #1-2

In some embodiments, the nonlinear function is a written in terms of a similar quantization function as in Embodiment #1-1, but the argument of the quantization function is scaled by an additional factor of 2 as follows:

$$N_{BD,\mu}^{B-slot} = \left\lceil \frac{B}{2^{\mu-\mu_{ref}-1}} \right\rceil \cdot \left\lceil \frac{N_{BD,\mu_{ref}}^{slot}}{2} \right\rceil$$

$$N_{CCE,\mu}^{B-slot} = \left\lceil \frac{B}{2^{\mu-\mu_{ref}-1}} \right\rceil \cdot \left\lceil \frac{N_{CCE,\mu_{ref}}^{slot}}{2} \right\rceil$$

where $\lceil x \rceil$ is the ceiling function giving the smallest integer no smaller than x. For this nonlimiting example embodiment, preferred PDCCH slot bundle size settings may be integer multiples of $2^{\mu-\mu_{ref}-1}$ As a more specific example of the nonlimiting example embodiment, the WD PDCCH processing capability requirements per slot for $\mu_{ref}=3$ can be taken as a reference.

According to the WD PDCCH monitoring capability definition in 3GPP Rel-15, the reference blind-decoding and CCE capability per slot are $$N_{BD,\mu_{ref}}^{slot} = 20 \text{ and } N_{CCE,\mu_{ref}}^{slot} = 32$$

respectively for $\mu_{ref}=3$ (120 kHz SCS);

Preferred PDCCH slot bundle size settings for the 480 kHz subcarrier spacing ($\mu=5$) may then be integer multiples of 2:

a) For example, with B=2, the WD PDCCH processing capability requirements per B slot-bundle are then given by $$N_{BD,\mu=5}^{2\text{-}slot} = 10 \text{ and } N_{CCE,\mu=5}^{2\text{-}slot} = 16;$$

and b) For example, with B=4, the WD PDCCH processing capability requirements per B slot-bundle are then given by $$N_{BD,\mu=5}^{4\text{-}slot} = 20 \text{ and } N_{CCE,\mu=5}^{4\text{-}slot} = 32.$$

The WD PDCCH processing capability requirements for B=3 are the same as those for B=4; and Preferred PDCCH slot bundle size settings for the 960 kHz subcarrier spacing ($\mu=6$) may then be integer multiples of 4:

a) For example, with B=4, the WD PDCCH processing capability requirements per B slot-bundle are then given by $$N_{BD,\mu=6}^{4\text{-}slot} = 10 \text{ and } N_{CCE,\mu=6}^{4\text{-}slot} = 16.$$

The WD PDCCH processing capability requirements for B=2 or 3 are the same as those for B=4; and b) For example, with B=8, the WD PDCCH processing capability requirements per B slot-bundle are then given by $$N_{BD,\mu=6}^{8\text{-}slot} = 20 \text{ and } N_{CCE,\mu=6}^{8\text{-}slot} = 32.$$

The WD PDCCH processing capability requirements for B=5, 6, or 7 are the same as those for B=8.

With this embodiment, twice as many capability values per B-slot bundle are defined compared to Embodiment #1-1. For the example of 480 kHz SCS with 120 kHz reference SCS, capability values are defined for PDCCH slot bundle sizes B=2, 4, 6, 8, . . . instead of B=4, 8, 12, 16, . . . .

In some embodiments, the non-linear scaling functions are generalized to the follows:

$$N_{BD,\mu}^{B-slot} = \left\lceil \frac{B}{2^{\mu-\mu_{ref}-n}} \right\rceil \cdot \left\lceil \frac{N_{BD,\mu_{ref}}^{slot}}{2^n} \right\rceil$$

$$N_{CCE,\mu}^{B-slot} = \left\lceil \frac{B}{2^{\mu-\mu_{ref}-n}} \right\rceil \cdot \left\lceil \frac{N_{CCE,\mu_{ref}}^{slot}}{2^n} \right\rceil$$

where $n \geq 1$.

Embodiment #1-3

In some embodiments, a different reference numerology can be used in conjunction with a different PDCCH slot bundle size B. That is, the nonlinear function determines:

$$N_{BD,\mu}^{B-slot} = N_{BD,\mu_{ref}}^{slot} \quad \text{where} \quad \mu_{ref} = \mu - \lceil \log_2 B \rceil$$

$$N_{CCE,\mu}^{B-slot} = N_{CCE,\mu_{ref}}^{slot} \quad \text{where} \quad \mu_{ref} = \mu - \lceil \log_2 B \rceil$$

where $\lceil x \rceil$ is the ceiling function giving the smallest integer no smaller than x and $\log_2 x$ is the base 2 logarithm of x. In some embodiments, the one or more of the following processing capability requirements may be configured in the WD 22:

Example

For the 480 kHz subcarrier spacing (μ=5), the WD PDCCH processing capability requirements per B=4 slots are given by $$N_{BD,\mu=5}^{4\text{-}slot} = N_{DB,\mu_{ref}=3}^{slot} = 20 \text{ and } N_{CCE,\mu=5}^{4\text{-}slot} = N_{CCE,\mu_{ref}=3}^{slot} = 32,$$

i.e., the per-slot capabilities corresponding to 120 kHz SCS. The WD PDCCH processing capability requirements for B=3, are the same as those for B=4;

For the 480 kHz subcarrier spacing (μ=5), the WD PDCCH processing capability requirements per B=8 slots are given by $$N_{BD,\mu=5}^{8\text{-}slot} = N_{BD,\mu_{ref}=2}^{slot} = 22 \text{ and } N_{CCE,\mu=5}^{8\text{-}slot} = N_{CCE,\mu_{ref}}^{slot} = 48,$$

i.e., the per-slot capability corresponding to 60 kHz SCS. The WD PDCCH processing capability requirements for B=5, 6, or 7 are the same as those for B=8;

For the 960 kHz subcarrier spacing (μ=6), the WD PDCCH processing capability requirements per B=8 slots are given by $$N_{BD,\mu=6}^{8\text{-}slot} = N_{BD,\mu_{ref}=3}^{slot} = 20 \text{ and } N_{CCE,\mu=6}^{8\text{-}slot} = N_{CCE,\mu_{ref}=3}^{slot} = 32,$$

i.e., the per-slot capabilities corresponding to 120 kHz SCS. The WD PDCCH processing capability requirements for B=5, 6, 7 are the same as those for B=8; and For the 960 kHz subcarrier spacing (μ=6), the WD PDCCH processing capability requirements per B=16 slots are given by $$N_{BD,\mu=6}^{16\text{-}slot} = N_{BR,\mu_{ref}=2}^{slot} = 22 \text{ and } N_{CCE,\mu=6}^{16\text{-}slot} = N_{CCE,\mu_{ref}=2}^{slot} = 48,$$

i.e., the per-slot capability corresponding to 60 kHz SCS. The WD PDCCH processing capability requirements for B=9, 10, . . . , 15 are the same as those for B=16.

Embodiment #1-4

To cover the cases where $\mu_{ref} = \mu - \lceil \log_2 B \rceil$ is greater than 3 or smaller than 0, the above example embodiments can be combined. First compute $\mu_{ref} = \mu - \lceil \log_2 B \rceil$ $$\text{then compute } N_{BD,\mu}^{B-slot} = \begin{cases} N_{BD,\mu_{ref}}^{slot} & \text{if } 0 \leq \mu_{ref} \leq 3 \\ \left\lceil \frac{N_{BD,\mu=3}^{slot}}{2^{\mu_{ref}-3}} \right\rceil & \text{if } \mu_{ref} > 3 \\ \frac{N_{BD,\mu=0}^{slot}}{2^{\mu_{ref}}} & \text{if } \mu_{ref} < 0 \end{cases}$$

$$\text{then compute } N_{CCE,\mu}^{B-slot} = \begin{cases} N_{CCE,\mu_{ref}}^{slot} & \text{if } 0 \leq \mu_{ref} \leq 3 \\ \left\lceil \frac{N_{CCE,\mu=3}^{slot}}{2^{\mu_{ref}-3}} \right\rceil & \text{if } \mu_{ref} > 3 \\ \frac{N_{CCE,\mu=0}^{slot}}{2^{\mu_{ref}}} & \text{if } \mu_{ref} < 0 \end{cases}$$

In some embodiments:

For the 480 kHz subcarrier spacing (μ=5), the WD PDCCH processing capability requirements per B=4, 8, 16, 32 slots are given by the per slot processing capability requirements for μ=3, 2, 1, 0, respectively:

a) The WD PDCCH processing capability requirements for B=2 are given by given by $$N_{BD,\mu=5}^{2-slot} = \left\lceil \frac{N_{BD,\mu=3}^{slot}}{2^{\mu_{ref}-3}} \right\rceil = 10 \text{ and } N_{CCE,\mu=5}^{2-slot} = \left\lceil \frac{N_{CCE,\mu=3}^{slot}}{2^{\mu_{ref}-3}} \right\rceil = 16;$$

and b) The WD PDCCH processing capability requirements for B=64 are given by given $$N_{BD,\mu=5}^{64-slot} = \frac{N_{BD,\mu=0}^{slot}}{2^{\mu_{ref}}} = 88 \text{ and } N_{CCE,\mu=5}^{64-slot} = \frac{N_{CCE,\mu=0}^{slot}}{2^{\mu_{ref}}} = 112.$$

Embodiment 1a

In some embodiments, the WD PDCCH processing capability requirements per B slot-bundle given by the following functions, $$N_{BD,\mu}^{B-slot} = f_{BD}\left(B, \mu, \mu_{ref}, N_{BD,\mu_{ref}}^{slot}\right) \text{ and}$$

$$N_{CCE,\mu}^{B-slot} = f_{CCE}\left(B, \mu, \mu_{ref}, N_{CCE,\mu_{ref}}^{slot}\right),$$

provide an extrapolation of the per-slot processing capabilities $$N^{slot}_{BD,\mu_{ref}} \text{ and } N^{slot}_{CCE,\mu_{ref}}$$

for the reference numerology. The extrapolation can be a linear or non-linear function of μ, and may be different than the function that provides a fit to the WD PDCCH processing capability requirements defined for $\mu \le \mu_{ref}$.

In some embodiments, the extrapolation function can be of the same form as the exponential fitting functions shown above, but with a different fitting coefficients.

In some embodiments, the extrapolation can be a linear function of μ that passes through the per-slot monitoring capability value for the reference numerology $\mu_{ref}$, i.e.:

$$N^{B-slot}_{BD,\mu} = B \cdot m_{BD}(\mu - \mu_{ref}) + N^{slot}_{BD,\mu_{ref}}$$

$$N^{B-slot}_{CCE,\mu} = B \cdot m_{CCE}(\mu - \mu_{ref}) + N^{slot}_{CCE,\mu_{ref}}$$

where $m_{BD}$ and $m_{CCE}$ are negative-valued slope parameters that provide linear scaling of the per-slot monitoring capabilities as μ increases. In some embodiments, the values of the PDCCH slot bundle size B can be constrained to the preferred values of B for each value of μ as described in Embodiment #1-1. In some embodiments, the scaling slope parameters are defined separately for different WD processing capability classes, e.g., a lower capability class and a higher capability class.

Embodiment 2—PDCCH Monitoring for Cell Specific Search Space Configurations

As mentioned above, one possible option is to reduce the PDCCH monitoring frequency to allow more time for the WD 22 to process PDCCH. The current 3GPP specifications allow a periodicity and offset to be configured. However, for the purpose of monitoring Type0A-PDCCH CSS (for other system information, OSI), Type1-PDCCH CSS (for random access response), Type2-PDCCH CSS (for paging) and Type3-PDCCH CSS (e.g., for group common signaling) for this configuration is cell specific. Thus, only one common offset can be configured for all WDs 22 which implies that all WDs 22 will monitor PDCCH in the same occasion. This will effectively restrict the network node 16 (gNB) to only schedule PDCCH in a subset of all slots. For example, if the periodicity is set to 8 slots and the offset to 0, this means all WDs 22 will only monitor PDCCH CSS in slot 0, 8, 16 and so on. Currently, the WD 22 determines the PDCCH monitoring occasions according to the following procedure:

A WD 22 may determine a PDCCH monitoring occasion on an active downlink (DL) bandwidth part (BWP) from the PDCCH monitoring periodicity, the PDCCH monitoring offset, and the PDCCH monitoring pattern within a slot. For search space set s, the WD 22 determines that a PDCCH monitoring occasion(s) exists in a slot with number $$n^{\mu}_{s,f}$$

[4, 3GPP TS 38.211] in a frame with number $n_f$ if $$\left(n_f \cdot N^{frame,\mu}_{slot} + n^{\mu}_{s,f} - o_s\right) \bmod k_s = 0.$$

The WD 22 may monitor PDCCH candidates for search space set s for $T_s$ consecutive slots, starting from slot $$n^{\mu}_{s,f},$$

and not monitor PDCCH candidates for search space set s for the next $k_s - T_s$ consecutive slots. The PDCCH monitoring periodicity of $k_s$ slots and a PDCCH monitoring offset of $o_s$ slots, and a duration of $T_s < k_s$ slots may indicate a number of slots where the search space set s exists.

Because a reason to reduce the monitoring frequency is to give more time for each WD 22 to decode PDCCH, in principle different WDs 22 could monitor PDCCH in different slots. For example, WD1 on slot 0, 8, 16, . . . WD2 in slot 1, 9, 17, . . . and so on. However, because the current configuration is cell specific this is currently not possible. Thus, some embodiments are disclosed as follows.

In some embodiments, the signaled offset $o_s$ is replaced by an offset $\hat{o}_s$ that is a function of a WD 22 ID, the monitoring periodicity $k_s$, and an additional parameter N that determines how many slots within the period that have a WD ID associated with it and the signaled offset $o_s$. In some embodiments, the parameter N can be signaled as a fraction of the periodicity $k_s$, for example 1, ½, ¼ and so on. For example, the function can be $$(\hat{o}_s + o_s) \bmod k_s = \frac{k_s}{N} \cdot (\text{UE\_ID} \bmod N).$$

The periodicity $k_s$ may be configured to be 8 and N can be configured to be 8/2=4 and the offset $o_s$=1. In this configuration each WD 22 will monitor PDCCH every $8^{th}$ slot and the network node 16 should be capable of scheduling PDCCH every second slot. The PDCCH monitoring slots for this example are illustrated in Table 5 below.

TABLE 5

| UE ID mod 8 | $\hat{o}_s$ |
|---|---|
| 0 | 7 |
| 1 | 1 |
| 2 | 3 |
| 3 | 5 |
| 4 | 7 |
| 5 | 1 |
| 6 | 3 |
| 7 | 5 |

In some embodiments, the offset $\hat{o}_s$ is only a function of a WD 22 ID and the monitoring periodicity $k_s$. For example, the function can be $\hat{o}_s$=WD_ID mod $k_s$. In this embodiment, each WD 22 may be mapped to one slot within the period and every slot has a WD_ID associated with it. That is, the network node is capable of scheduling PDCCH in every slot, in some embodiments. This corresponds to N=$k_s$ and $o_s$=0 in the general form. In this embodiment, no new parameters need to be signaled.

In some embodiments, the offset $o_s$ is only a function of a WD 22 ID, the monitoring periodicity $k_s$ and an additional parameter N that determines how many slots withing the period that have a WD_ID associated with it. For example, the function can be $$\hat{o}_s = \frac{k_s}{N} \cdot (\text{UE\_ID mod } N).$$

In this configuration, each WD 22 may monitor PDCCH every $8^{th}$ slot and the network node 16 may be capable of scheduling PDCCH every second slot. This corresponds to $o_s=0$ in the general form.

In some embodiments, the offset $o_s$ is a function of a WD ID, the monitoring periodicity $k_s$ and the signaled offset $o_s$. For example, the function can be $(\hat{o}_s+o_s)$ mod $k_s$=WD_ID mod $k_s$. In this configuration each WD will monitor PDCCH every $8^{th}$ slot and the network node 16 should be capable of scheduling PDCCH every slot, in some embodiments. This corresponds to $N=k_s$ in the general form.

The WD ID should be known to both the WD 22 and the network node 16, e.g., the gNB. For different types of PDCCH CSS, different IDs can be used. One solution is to use the RNTI (or a function of it) that the WD 22 is using when monitoring a particular type of PDCCH CSS. The applicable RNTIs for different types of PDCCH CSS are listed in Table 6 below.

TABLE 6

| PDCCH CSS type | RNTI |
| --- | --- |
| Type0A-PDCCH CSS | SI-RNTI |
| Type1-PDCCH CSS | RA-RNTI, a MsgB-RNTI, or a TC-RNTI |
| Type2-PDCCH CSS | P-RNTI |
| Type3-PDCCH CSS | INT-RNTI, SFI-RNTI, TPC-PUSCH-RNTI, TPC-PUCCH-RNTI, TPC-SRS-RNTI, or CI-RNTI, C-RNTI, MCS-C-RNTI, CS-RNTI(s), or PS-RNTI |

The SI- and P-RNTI are fixed for all WDs 22 (FFFF and FFFE) and thus all WDs 22 would monitor the PDCCH in the same slot. For SI-RNTI, the information is common to all WDs 22. For P-RNTI on the other hand, the message is in general (except for, e.g., SI change notifications) intended for one WD 22. Thus, for Type2-PDCCH CSS, one option is to use a function of the 5G-S-TMSI as is done for the paging frame and paging occasion calculation in 3GPP TS 38.304.

An alternative to using the WD ID when determining the offset, for the case of monitoring occasions for random access response the WD ID in the offset calculation function in any of the previous examples is replaced by the PRACH occasion slot number modulo the number of physical random access channel (PRACH) occasion slots for the valid PRACH configuration.

Embodiment 3—PDCCH Monitoring for Type0-PDCCH CSS (SIB1)

As discussed above, the WD 22 monitors two consecutive slots $n_0$ and $n_0+1$ for SS/PBCH block and CORESET multiplexing pattern 1. To relax the processing requirements in the WD 22, it may be beneficial to modify this condition.

In some embodiments, the WD 22 is not required to monitor two consecutive slots. Instead it only monitors the slot $n_0$ as described by the procedure in 3GPP TS 38.213 § 13.

In some embodiments, the WD 22 monitors two slots, but the slots are not consecutive. Instead, they are a function of the subcarrier spacing used for the PDCCH scheduling SIB1, i.e. the subcarrier spacing of the DL initial bandwidth part. For example, in some embodiments, the WD 22 monitors $n_0$ and $n_0+x$ where x is defined as $x=\lceil 2^{\mu-3} \rceil$ where μ is the sub-carrier parameter defined in 3GPP TS 38.211. This definition would give x=4 and x=8 for 480 and 960 kHz subcarrier spacing (SCS), respectively. In some embodiments, x is explicitly defined for each sub-carrier spacing using e.g. a lookup table. In some embodiments, x is determined as a function of the subcarrier spacing and explicit signaling using the spare bit in the MIB, giving two configuration possibilities (offset values) per subcarrier spacing.

According to one aspect, a network node 16 is configured to communicate with a wireless device (WD 22). The network node 16 includes a radio interface 62 and/or comprising processing circuitry 68 configured to configure the WD 22 to process a physical downlink control channel (PDCCH) according to a numerology and a nonlinear function of the numerology and a slot bundle size.

According to this aspect, in some embodiments, the nonlinear function is based on a quantization function. In some embodiments, the nonlinear function is based at least in part on a reference numerology which is a logarithmic function of a slot bundle size.

According to another aspect, a method in a network node 16 includes configuring the WD 22 to process a physical downlink control channel (PDCCH) according to a numerology and a nonlinear function of the numerology and a slot bundle size.

According to this aspect, in some embodiments, the nonlinear function is based on a quantization function. In some embodiments, the nonlinear function is based at least in part on a reference numerology which is a logarithmic function of a slot bundle size.

According to yet another aspect, a WD 22 is configured to communicate with a network node 16. The WD 22 includes a radio interface 82 and/or processing circuitry 84 configured to determine a physical downlink control channel (PDCCH) monitoring occasion based at least in part on a PDCCH monitoring offset, the PDCCH monitoring offset being based at least in part on an ID of the WD 22.

According to this aspect, in some embodiments, the PDCCH monitoring offset is further based in part on a monitoring periodicity. In some embodiments, a monitoring occasion is configured to cause the WD 22 to monitor at least one slot during a monitoring occasion.

According to another aspect, a method implemented in a wireless device (WD) includes determining a physical downlink control channel (PDCCH) monitoring occasion based at least in part on a PDCCH monitoring offset, the PDCCH monitoring offset being based at least in part on an ID of the WD 22.

According to this aspect, in some embodiments, the PDCCH monitoring offset is further based in part on a monitoring periodicity. In some embodiments, a monitoring occasion is configured to cause the WD 22 to monitor at least one slot during a monitoring occasion.

Some Examples may include one or more of the following:

Example A1. A network node 16 configured to communicate with a wireless device 22 (WD 22), the network node 16 configured to, and/or comprising a radio interface 62 and/or comprising processing circuitry 68 configured to:

configure the WD 22 to process a physical downlink control channel (PDCCH) according to a numerology and a nonlinear function of the numerology and a slot bundle size.

Example A2. The network node 16 of Example A1, wherein the nonlinear function is based on a quantization function.

Example A3. The network node 16 of Example A1, wherein the nonlinear function is based at least in part on a reference numerology which is a logarithmic function of a slot bundle size.

Example B1. A method implemented in a network node 16, the method comprising:

configuring the WD 22 to process a physical downlink control channel (PDCCH) according to a numerology and a nonlinear function of the numerology and a slot bundle size.

Example B2. The method of Example B1, wherein the nonlinear function is based on a quantization function.

Example B3. The method of Example B1, wherein the nonlinear function is based at least in part on a reference numerology which is a logarithmic function of a slot bundle size.

Example C1. A wireless device 22 (WD 22) configured to communicate with a network node 16, the WD 22 configured to, and/or comprising a radio interface 82 and/or processing circuitry 84 configured to:

determine a physical downlink control channel (PDCCH) monitoring occasion based at least in part on a PDCCH monitoring offset, the PDCCH monitoring offset being based at least in part on an ID of the WD 22.

Example C2. The WD 22 of Example C1, wherein the PDCCH monitoring offset is further based in part on a monitoring periodicity.

Example C3. The WD 22 of Example C1, wherein a monitoring occasion is configured to cause the WD 22 to monitor at least one slot during a monitoring occasion.

Example D1. A method implemented in a wireless device 22 (WD 22), the method comprising:

determining a physical downlink control channel (PDCCH) monitoring occasion based at least in part on a PDCCH monitoring offset, the PDCCH monitoring offset being based at least in part on an ID of the WD 22.

Example D2. The method of Example D1, wherein the PDCCH monitoring offset is further based in part on a monitoring periodicity.

Example D3. The method of Example D1, wherein a monitoring occasion is configured to cause the WD 22 to monitor at least one slot during a monitoring occasion.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| BWP | Bandwidth part |
| CCE | Control channel element |
| CORESET | Control resource set |
| CRB | Common resource block |
| CSI | Channel-state information |
| CSI-RS | CSI reference signa |
| DCI | Downlink Control Information |
| DM-RS | Demodulation reference signal |
| FR1 | Frequency range 1 as defined in [8, 3GPP TS 38.104] |
| FR2 | Frequency range 2 as defined in [8, 3GPP TS 38.104] |
| IE | Information element |
| PBCH | Physical broadcast channel |
| PDCCH | Physical downlink control channel |
| PDSCH | Physical downlink shared channel |
| PRACH | Physical random-access channel |
| PRB | Physical resource block |
| PSD | Power spectral density |
| PSS | Primary synchronization signal |
| PT-RS | Phase-tracking reference signal |
| PUCCH | Physical uplink control channel |
| PUSCH | Physical uplink shared channel |
| REG | Resource-element group |
| SIB | System information block |
| SRS | Sounding reference signal |
| SSS | Secondary synchronization signal |
| VRB | Virtual resource block |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node communicatively couplable with a wireless device, WD, the network node comprising processing circuitry and memory storing instructions executable by the processing circuitry to cause the network node to:

configure the WD, with signaling according to an operating numerology μ;

monitor for physical downlink control channel, PDCCH, in slots which are selected based at least in part on the operating numerology μ; and transmit PDCCH to the WD in at least one of two slots $n_0$ and $n_0+x$ in which the WD monitors for PDCCH, and $x=\lceil 2^{\mu-3} \rceil$, where ⌈ ⌉ is a ceiling function giving the smallest integer no smaller than its argument, where x is greater than one.

2. The network node of claim 1, wherein the operating numerology μ corresponds to the subcarrier spacing used for a PDCCH scheduling system information block 1, SIB1.

3. The network node of claim 1, wherein the operating numerology μ is one of μ=5 and μ=6.

4. A method in a network node configured to communicate with a wireless device, WD, the method comprising:

configuring the WD by signaling with an operating numerology μ;

monitoring for physical downlink control channel, PDCCH, in slots which are selected based at least in part on the operating numerology μ; and transmitting PDCCH to the WD in at least one of two slots $n_0$ and $n_0+x$ in which the WD monitors for PDCCH, and $x=\lceil 2^{\mu-3} \rceil$, where ⌈ ⌉ is a ceiling function giving the smallest integer no smaller than its argument, and x is greater than one.

5. The method of claim 4, wherein the operating numerology μ corresponds to the subcarrier spacing used for a PDCCH scheduling system information block 1, SIB1.

6. The method of claim 4, wherein the operating numerology μ is one of μ=5 and μ=6.

7. A wireless device, WD communicatively couplable with a network node, the WD comprising processing circuitry and memory storing instructions executable by the processing circuitry to configure the WD to:

receive from the network node, signaling to configure the WD with an operating numerology μ;

monitor for physical downlink control channel, PDCCH, in slots which are selected based at least in part on the operating numerology μ; and monitor for the PDCCH in two slots $n_0$ and $n_0+x$, $x=\lceil 2^{\mu-3} \rceil$, where ⌈ ⌉ is a ceiling function giving the smallest integer no smaller than its argument, and x is greater than one.

8. The WD of claim 7, wherein the PDCCH is for system information block 1, SIB1, scheduling, and the operating numerology μ corresponds to a subcarrier spacing of the PDCCH.

9. The WD of claim 7, wherein the operating numerology μ is one of μ=5 and μ=6.

10. A method in a wireless device, WD, configured to communicate with a network node, the method comprising:

receiving, from the network node, signaling to configure the WD with an operating numerology μ;

monitoring for physical downlink control channel, PDCCH, in slots which are selected based at least in part on the operating numerology μ; and monitoring for the PDCCH in two slots $n_0$ and $n_0+x$, and $x=\lceil 2^{\mu-3} \rceil$, where ⌈ ⌉ is a ceiling function giving the smallest integer no smaller than its argument, and x is greater than one.

11. The method of claim 10, wherein the PDCCH is for system information block 1, SIB1, scheduling, and the operating numerology μ corresponds to a subcarrier spacing of the PDCCH.

12. The method of claim 10, wherein the operating numerology μ is one of μ=5 and μ=6.

* * * * *